(12) United States Patent
Namii et al.

(10) Patent No.: US 6,327,079 B1
(45) Date of Patent: Dec. 4, 2001

(54) STEREOSCOPIC MICROSCOPE

(75) Inventors: Yasushi Namii, Hachioji; Toyoharu Hanzawa, Mitaka, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/056,906

(22) Filed: Apr. 8, 1998

(30) Foreign Application Priority Data

Apr. 9, 1997 (JP) ..................................................... 9-105388

(51) Int. Cl.[7] .............................. G02B 21/22; G02B 21/00
(52) U.S. Cl. ........................ 359/376; 359/368; 359/380; 359/378
(58) Field of Search ..................................... 359/368–390, 359/434–435, 656–661

(56) References Cited

U.S. PATENT DOCUMENTS

| | | | |
|---|---|---|---|
| 4,798,451 | * 1/1989 | Fujiwara | 359/375 |
| 5,394,267 | * 2/1995 | Hanzawa | 359/376 |
| 5,444,573 | * 8/1995 | Saito | 359/661 |
| 5,612,817 | 3/1997 | Strahle | 359/377 |
| 5,701,196 | * 12/1997 | Nakamura | 359/661 |

FOREIGN PATENT DOCUMENTS

| | | |
|---|---|---|
| 4-156412 | 5/1992 | (JP) . |
| 5-173079 | 7/1993 | (JP) . |
| 6-337351 | 12/1994 | (JP) . |
| 7-140395 | 6/1995 | (JP) . |

* cited by examiner

*Primary Examiner*—Thong Nguyen
(74) *Attorney, Agent, or Firm*—Pillsbury Winthrop LLP

(57) ABSTRACT

A stereoscopic microscope comprising a uniaxial optical system consisting of an objective lens system and a varifocal optical system which is coaxial with the objective lens system, and at least a pair of observation optical systems, wherein right and left optical axes of the observation optical systems pass through locations different from that of an optical axis of the uniaxial optical system and wherein the uniaxial optical system comprises a positive lens component made of an extraordinary dispersive optical material.

23 Claims, 24 Drawing Sheets

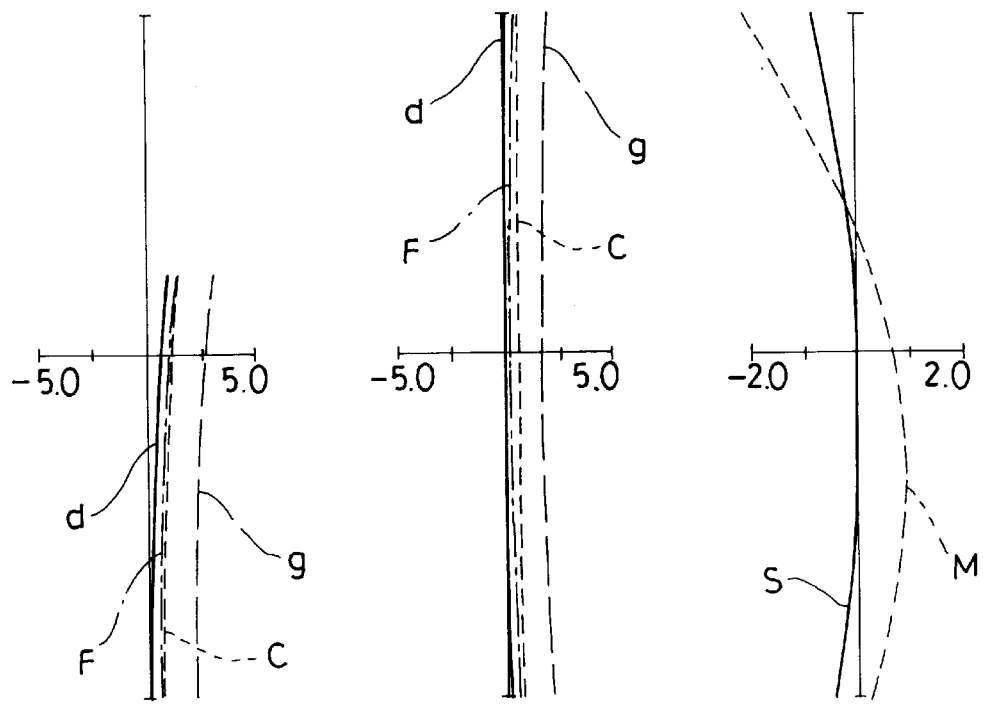
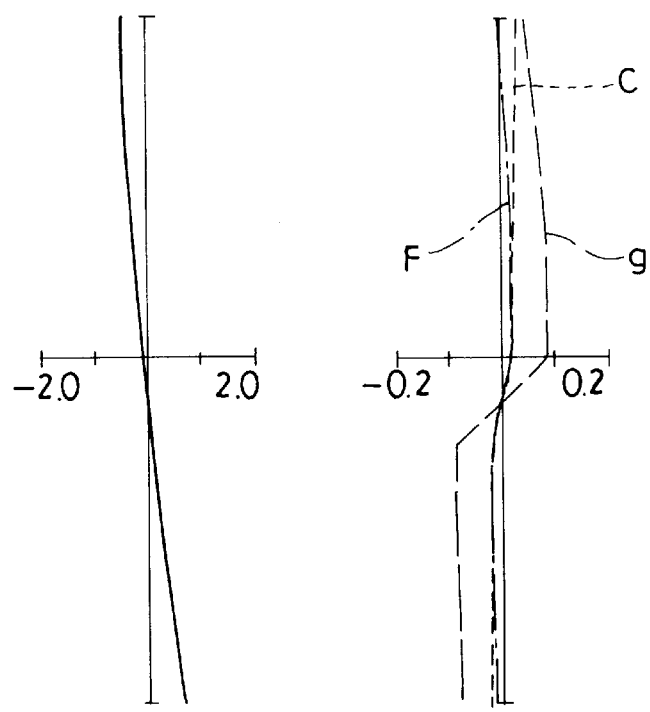

STEREOSCOPIC MICROSCOPE

BACKGROUND OF THE BACKGROUND

1. Field of the Invention

The present invention relates to a stereoscopic microscope which comprises an objective lens system, a vari-focal optical system which comprises at least an image surface, and is coaxial with the objective lens component and common to right and left optical paths, and a pair of right and left observation optical systems each of which is disposed after the vari-focal optical system, and comprises an aperture stop, an imaging lens component and an eyepiece the microscope being configured as an eccentric optical system wherein right and left observation optical axes determined by the pair of right and left aperture stops pass through locations different from that of an optical axis of the vari-focal optical system.

2. Description of Related Art

Stereoscopic microscopes which provide magnified stereoscopic information of objects are useful for performing works on objects which are being observed. Since stereoscopic microscopes are effectively used for surgical operations in particular, description will first be provided of a surgical microscope.

In order to enable more delicate surgical operations, it is desired to configure the surgical microscope so as to allow an image to be observed by a plurality of persons at the same time in optional directions. Therefore, there are known surgical microscopes such as a stereoscopic microscope disclosed by Japanese Patent Kokai Publication No. Hei 5-173079 which is configured to pass a light bundle which is to be used for forming images to be observed by right and left eyes through a single vari-focal optical system.

This publication discloses a fact that a rotating direction can be freely changed by rotating, around an optical axis of a vari-focal system, aperture stops for right and left optical paths which are disposed after the vari-focal system.

Further, an optical system disclosed by Japanese Patent Kokai Publication No. Hei 7-140395 is known as another conventional example of stereoscopic microscope of this type. This conventional example corrects aberrations more favorably and configures the optical system more compact by disposing an optical system which relays an image one cycle after the vari-focal optical system of the stereoscopic microscope disclosed by Japanese Patent Kokai Publication No. Hei 5-173079.

The stereoscopic microscope mentioned above as the conventional example uses an optical system designed as an achromat which favorably corrects chromatic aberration of the C-line and F-line. Though colors are not so remarkable in an optical system which is not eccentric even when it is designed as an achromat, an eccentric optical system like this conventional example has a defect that it allows colors to be conspicuous. This is because the eccentricity is equivalent to enlargement of a numerical aperture, whereby colors are shifted laterally due to lateral chromatic aberration in observation optical systems. When images to be observed by a right eye and a left eye are formed by an optical system which has lateral chromatic aberration, outward and inward portions of contours of the images (hereinafter referred to as inwards and outwards respectively) are differently colored. In case of the conventional example described above, for example, inwards of images are yellow, whereas outwards are violet. When such colored images are fused for stereoscopic observation, an inward of an image to be observed by the left eye is overlapped with an outward of an image to be observed by the right eye, whereby an image formed by overlapping the yellow with the violet seems flickering and aggravates fatigue of the eyes. It is not proper to observe such an image through a surgical microscope for surgical operations which can require long periods of time.

For correcting the lateral chromatic aberration which colors the outwards of the images in violet, the ordinary correction of chromatic aberration of the C-line and the F-line is insufficient, and it is necessary to design an optical system as an apochromat which corrects chromatic aberration not only of the C-line and the F-line but also that of the g-line. In other words, it is required to correct secondary spectra.

SUMMARY OF THE INVENTION

A primary aspect of the present invention is to provide a stereoscopic microscope using an eccentric vari-focal optical system which corrects aberrations, chromatic aberration in particular.

Another aspect of the present invention is to provide a stereoscopic microscope which has improved operability and a high working property, thereby causing less fatigue after a long work.

The stereoscopic microscope according to the present invention comprises an uniaxial optical system which consists of an objective lens system and a vari-focal optical system coaxial with the objective lens system, a pair, right and left, of aperture stops which are disposed after (the image side of) the vari-focal optical system, and at least a pair of observation optical systems which comprise a plurality of eyepieces, wherein optical axes of the observation optical systems are determined by the pair of aperture stops and the observation optical systems pass through locations different from that of an optical axis of the uniaxial optical system and wherein the uniaxial optical system uses a positive lens component made of an extraordinarily dispersive optical material which satisfies the following condition (1):

$$\Delta\theta_{gF} > 0.01, \nu_d > 50 \tag{1}$$

In the stereoscopic microscope according to the present invention described above, an imaging relay optical system of one cycle may be disposed after the vari-focal optical system in the uniaxial optical system.

Further, the stereoscopic microscope according to the present invention comprises an uniaxial optical system which consists of an objective optical system, a vari-focal optical system and an imaging relay optical system of one cycle, and at least a pair of observation optical systems which is disposed after the relay optical system, and comprises a pair of right and left aperture stops, imaging lens components and eyepieces, wherein the optical axes of the observation optical systems are determined by the pair of aperture stops and pass through locations different from that of the uniaxial optical system, wherein at least an image rotator is disposed after the imaging relay optical system of one cycle and before the observation optical systems, and wherein the image rotator has a rotating axis and the observation optical systems have a rotating axis. The rotating axis of each observation optical system and the rotating axis of the image rotator are arranged to be parallel to each other and are rotated with a ratio of their rotating angles of 1:2.

BRIEF DESCRIPTION OF THE DRAWINGS

FIGS. 25A through 25E and FIGS. 26A through 26E show aberration curves of the first embodiment.

DETAILED DESCRIPTION OF THE PREFERRED EMBODIMENTS

The stereoscopic microscope according to the present invention consists of a uniaxial optical system (an optical system disposed so as to locate center axes on the same axis) which comprises an objective lens system, a vari-focal optical system coaxial with the objective lens system and an imaging relay optical system of one cycle, and at least a pair of right and left observation optical system which are disposed after the relay optical system, and composed of a pair of right and left aperture stops, imaging lens components, reflecting members and eyepieces, and is characterized in that optical axes of the observation optical systems which are determined by the pair of aperture stops pass through locations different from that of an optical axis of the uniaxial optical system, and that positive lens components comprised in the vari-focal optical system and the relay optical system include a lens component made of an extraordinarily dispersive optical material which satisfies the following condition (1):

$$\Delta\theta_{gF}>0.01, v_d>50 \quad (1)$$

wherein the reference symbol $\Delta\theta_{gF}$ represents an eccentricity of partial dispersion and the reference symbol $v_d$ designates an Abbe's number for the d-line.

Figure 1:
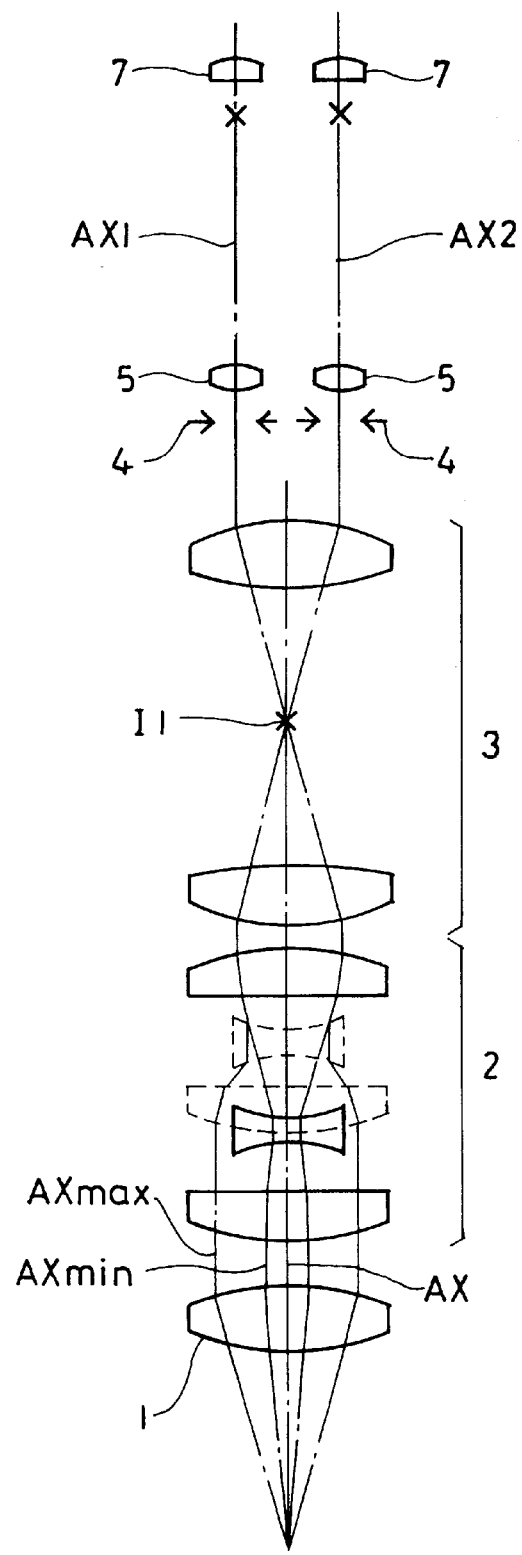
FIG. 1 shows a schematic view illustrating a stereoscopic microscope according to the present invention.

The stereoscopic microscope according to the present invention has a composition illustrated in FIG. 1, wherein a reference numeral 1 represents an objective lens system, a reference numeral 2 designates a vari-focal optical system which is coaxial with the objective lens system, a reference numeral 3 denotes a relay optical system of one cycle, a reference numeral 4 represents a pair, right and left, of aperture stops which are disposed after the relay optical system 3, a reference numeral 5 designates right and left imaging lens components which are disposed after the right and left aperture stops respectively, and a reference numeral 7 denotes right and left eyepieces: the members from the aperture stops to the eyepieces 7 composing the observation optical systems. In addition, a reflecting member or the like may be disposed between the imaging lens component 5 and the eyepiece 7. The stereoscopic microscope illustrated in FIG. 1 is a microscope wherein two right and left optical axes (observation optical axes) $AX_1$ and $AX_2$ of at least one observation optical system which are determined by the pair of right and left aperture stops pass through locations different from that of an axis AX of revolutional symmetry (hereinafter referred to as an objective optical axis) of the uniaxial optical system comprises the objective lens system, the vari-focal optical system and the imaging relay optical system of one cycle. Further, the imaging relay optical system 3 has an imaging point $I_1$ which is located therein. Further, the observation optical systems comprise the members from the aperture stops 4 to the eyepieces is accommodated in a binocular tube (not shown). The aperture stops 4 are accommodated in a binocular tube when they are disposed at a short distance from the imaging relay optical system 3 of one cycle, but may be disposed outside the binocular tube when they are disposed at a long distance from the imaging relay optical system 3 of one cycle.

Now, description will be made of the extraordinary dispersion of the extraordinary dispersive optical material used in the optical system of the stereoscopic microscope according to the present invention.

In the ordinary lens systems and optical systems such as objective lens systems, monochromatic aberrations such as spherical aberration are corrected taking the d-line as a corresponding wavelength. Further, chromatic aberration is corrected so as to reduce a difference between the C-line and the F-line. As an index of correction of chromatic aberration, an Abbe's number is defined as follows:

$$\nu_d = (n_d - 1)/(n_F - n_C) \quad (A)$$

In order to correct chromatic aberration, a glass material which has a large Abbe's number is used for a convex lens component and a glass material which has a small Abbe's number is used for a concave lens component. A larger difference between these Abbe's numbers makes it possible to correct chromatic aberration more easily.

However, this means can correct colors only within a wavelength region from the C-line to the F-line and allows colors having wavelengths outside this region to be produced more remarkably at wavelengths farther from the wavelength region described above. At short wavelengths at which refractive indices vary remarkably in particular, colors are produced remarkably and images look violet. To correct this phenomenon, it is necessary to correct chromatic aberration of the g-line which is violet. As an index for correction of the g-line, θg, is defined by the following formula (B):

$$\Delta\theta_{gF} = (n_g - n_F)/(n_F - n_C) \quad (B)$$

Figure 2:
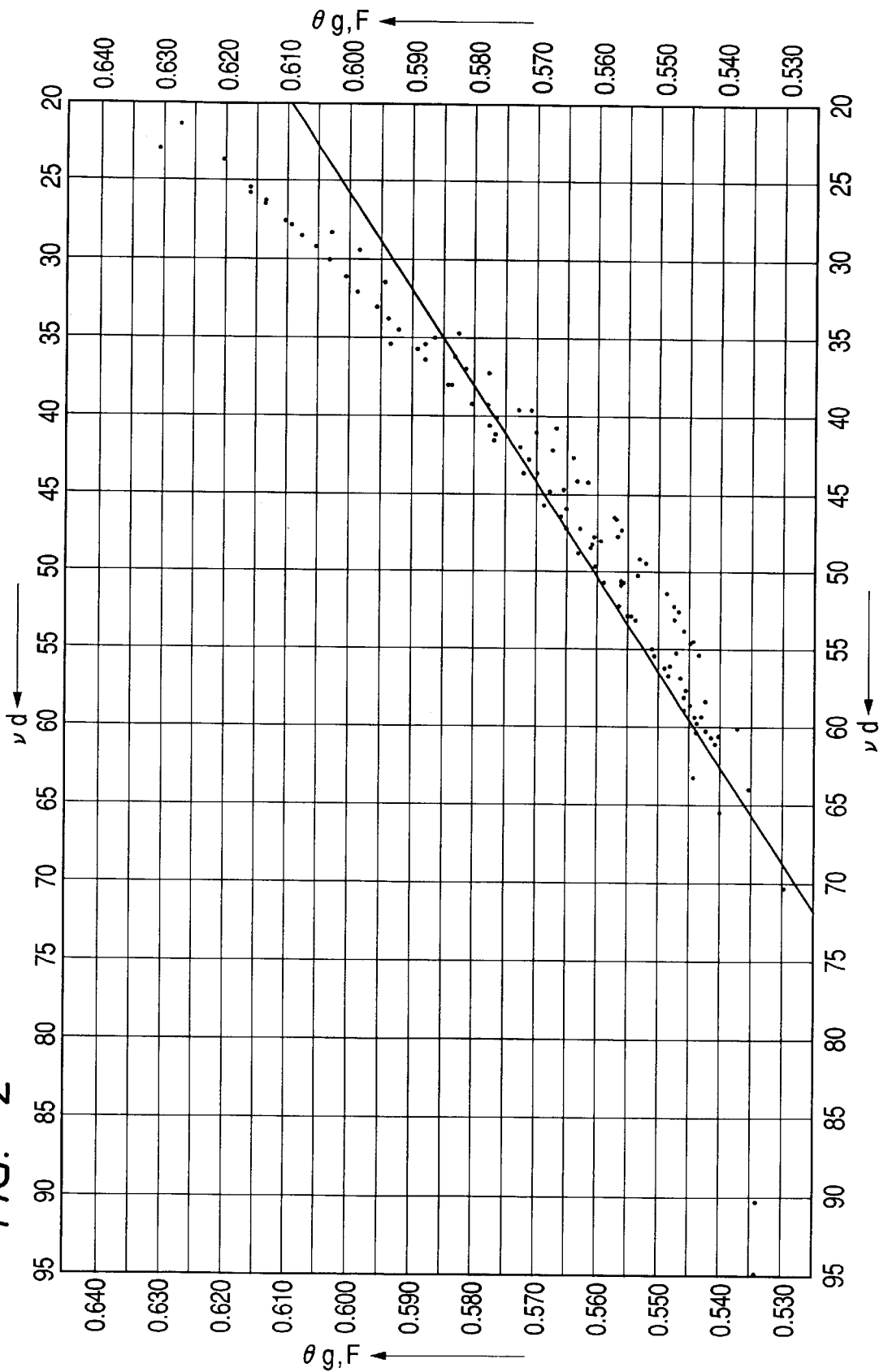
FIG. 2 shows a graph illustrating relationship between $\Delta_{gF}$ and $v_d$ of glass materials.

When $\nu_d$ and $\Delta\theta_{gF}$ of ordinary glass materials are plotted on a coordinates system, a graph which is nearly linear is traced as exemplified in FIG. 2. A standard straight line which represents the distribution of the ordinary glass materials is expressed by the following formula (C):

$$\theta = -0.00162\nu + 0.6416 \quad (C)$$

Since FIG. 2 is quoted from a catalog issued by Ohara, Co., Ltd., the formula (C) is determined on the basis of data listed in this catalog.

However, it is impossible to correct secondary spectra including the g-line only with the glass materials which are represented by this straight line. A difference from the formula (B) which indicates the index of correction of secondary spectra is defined as a deviation $\Delta\theta_{gF}$ of extraordinary dispersion by the following formula:

$$\Delta\theta_{gF} = \theta_{gF} - \theta$$

Since the secondary spectra can be corrected more easily as $\Delta\theta_{gF}$, expressed by the above formula has a larger absolute value, the present invention adopts $\Delta\theta_{gF} > 0.01$ as defined by the above-mentioned condition (1). Further, since a glass material which has a value of $\Delta\theta_{gF}$ satisfying the above-mentioned condition (1) has a large value of $\nu_d$, it is effective to use an extraordinarily dispersive optical material for a convex lens component and it is desirable that $\nu_d$ satisfies the condition (1). Specifically, it is desirable that $\nu_d$ is larger than 50.

If the condition (1) is not satisfied, it will be impossible to obtain an effect which is so high by using an extraordinarily dispersive optical material.

In order to correct the secondary spectra more favorably in the stereoscopic microscope according to the present invention, it is desirable to satisfy, in place of the condition (1), the following condition (1-1):

$$\Delta\theta_{gF} > 0.025, \nu_d > 75 \quad (1-1)$$

Since the vari-focal optical system of the stereoscopic microscope according to the present invention is an eccentric vari-focal optical system as described above, the observation optical axes are varied by changing a magnification. The observation optical axis is varied in lens units in particular which are disposed on the object side in the vari-focal optical system and have positive focal lengths.

When a magnification of a stereoscopic microscope shown in FIG. 1 is changed from a minimum level to a maximum level by the vari-focal optical system, an observation optical axis is varied from $AX_{min}$ to $AX_{max}$. In this case, the optical axis is varied remarkably in a lens unit (first lens unit) in particular which is disposed on the object side in the vari-focal optical system.

Since the observation optical axis is varied by changing a magnification of the stereoscopic microscope according to the present invention as described above, it is tedious to correct aberrations, chromatic aberration in particular which is produced in an amount variable between a low magnification and a high magnification.

It is possible to reduce the variation of chromatic aberration between the low magnification and the high magnification in the stereoscopic microscope according to the present invention by adopting an extraordinarily dispersive glass material for a convex lens component in a first lens unit (lens unit disposed on the object side) of the vari-focal optical system. At the low magnification, a lens unit which is disposed on the image side out of lens units which has positive focal lengths is located close to the first lens unit and rays are high on the object side positive lens unit. Accordingly, chromatic aberration may not be corrected sufficiently favorably only with the first lens unit at the low magnification. In such a case, chromatic aberration can be corrected by adopting an extraordinarily dispersive glass material for the image side lens unit out of the positive lens units.

When a splitting element is disposed between the vari-focal optical system and the relay optical system and a photographic system is not disposed in an optical path (another optical system does not exist between the vari-focal optical system and the relay optical system), it is sufficient to correct aberrations in an optical system ranging from the vari-focal optical system to an imaging point of the relay optical system. In this case, it is therefore possible to correct chromatic aberration favorably by disposing an extraordinarily dispersive member in a lens system which is located after the imaging point of the relay optical system.

When a light bundle is to be split by disposing an optical path splitting element or the like between the vari-focal optical system and the relay optical system, aberrations must be corrected in each of the vari-focal optical system and the relay optical system. In this case, chromatic aberration can be corrected favorably by dividing the relay optical system into lens units which are located before and after the imaging point thereof and using an extraordinarily dispersive glass material for convex lens components in a lens unit whichever has a longer focal length. When the lens units before and after the imaging point of the relay optical system have focal lengths which are equal to each other, it is adequate to use the extraordinarily dispersive glass material for convex lens components which have short focal lengths in the relay optical system.

When the extraordinarily dispersive glass material is used for only one lens component in the relay optical system, chromatic aberration remains at the imaging point of the relay optical system since the optical system is configured to correct chromatic aberration in the optical system as a whole. When indices and other images are set at this imaging point, chromatic aberration becomes conspicuous. In order to correct this defect, it is desirable to correct chromatic aberration at the imaging point by using the extraordinarily dispersive glass material before and after the imaging point of the relay optical system.

Then, description will be made of the vari-focal optical system of the stereoscopic microscope according to the present invention.

Rays which are incident and emerging onto and from the vari-focal optical system are made a focal so as to reduce a shift of an imaging surface which is to be caused by focusing and deviation of an image which is caused due to errors of reflecting surfaces. It is conceivable to compose this vari-focal optical system of three lens units, in order from the object side, a first lens unit which has a positive focal length, a second lens unit which has a negative focal length and a third lens unit which has a positive focal length.

When the vari-focal optical system comprises the three lens units described above, it is desirable to compose these lens units as described below. That is, it is desirable that the first lens unit is composed, in order from the object side, of a meniscus lens component having a convex surface on the object side and a positive lens component, the second lens unit comprises, in order from the object side, of a negative lens component and a meniscus lens component, and the third lens unit comprises, in order from the object side, of a meniscus lens component having a convex surface on the image side and a positive lens component.

By composing the first lens unit not of the positive lens component and the meniscus lens component, but of the meniscus lens component and the positive lens component in order from the object side as described above, it is possible to prevent principal points of the first lens unit and the second lens unit from being apart from each other. When the principal points of the first lens unit and the second lens unit are apart from each other, these two lens units have strong powers, thereby making it difficult to correct aberrations. Further, it is possible to reduce variations of lateral chromatic aberration by configuring the meniscus lens component of the first lens unit so as to have a convex surface on the object side.

Further, it is possible to prevent the secondary spectra from being conspicuous by disposing lens components made of an extraordinarily dispersive material in the object side positive lens unit (the first lens unit) and the image side positive lens unit (the third lens unit) respectively.

It is desirable that the first lens unit satisfies the following condition (2):

$$0.65 < f_{v1}/L_v < 1.45 \qquad (2)$$

wherein the reference symbol $L_v$ represents a maximum length of the vari-focal optical system and the reference symbol $f_{v1}$ designates a focal length of the first lens unit of the vari-focal optical system.

If the upper limit of 1.45 of the condition (2) is exceeded, the vari-focal optical system has a large total length, the objective lens system and the first lens unit of the vari-focal optical system will be enlarged, and the observation optical systems will be farther from an object, thereby being inconvenient for direct view. If the lower limit of 0.65 of the condition (2) is exceeded, each of the lens units of the vari-focal optical system will have a strong power, thereby making it difficult to correct aberrations.

Further, it is desirable that the vari-focal optical system satisfies the following conditions (3) and (4):

$$f_{p1}/f_{v1} < 1 \qquad (3)$$

$$f_{p1}/f_{v3} < 1 \qquad (4)$$

wherein the reference symbols $f_{v1}$ and $f_{v3}$ represent focal length of the first lens unit and the third lens unit respectively of the vari-focal optical system, and the reference symbols $f_{P1}$ and $f_{P3}$ designate focal lengths of the lens components made of the extraordinarily dispersive material in the first lens unit and the third lens unit respectively.

If the condition (3) or (4) is not satisfied, extraordinary dispersion will not exhibit its effect to correct chromatic aberration, thereby allowing chromatic aberration to remain.

In order to enhance a vari-focal ratio of the vari-focal optical system of the stereoscopic microscope according to the present invention, it is desirable to compose the vari-focal optical system of four lens units as described below. That is, it is desirable to compose the vari-focal optical system, in order from the object side, of a first positive lens unit, a second negative lens unit, a third positive lens unit and a fourth negative lens unit. Further, it is desirable that the first lens unit comprises, in order from the object side, a positive lens component and a positive lens component, the second lens unit comprises, in order from the object side, of a negative lens component and a negative lens component, the third lens unit comprises, in order from the object side, of a positive lens component and a positive lens component, and the fourth lens unit comprises a negative lens component.

By configuring the vari-focal optical system as described above, it is possible to obtain a high vari-focal ratio and correct aberrations favorably.

It is desirable that the vari-focal optical system comprises the four lens units is configured so as to satisfy the condition (2-1) mentioned below. For a reason which is the same as that described with reference to the vari-focal optical system which comprises the three lens units, dissatisfaction of the condition (2-1) is undesirable:

$$0.34 < f_{V1}/L_{V1} < 1.4 \qquad (2-1)$$

Out of the positive lens units disposed in the vari-focal optical system which comprises the four lens units, the third lens unit is disposed on the image side. Therefore, it is desirable to dispose convex lens components made of the extraordinarily dispersive optical material satisfying the condition (1) or (1-1) in the first lens unit and the third lens unit.

As a most simple composition of the objective lens system of the stereoscopic microscope according to the present invention, it is conceivable to compose this lens system only of a positive lens unit which consists of a single positive lens component. In this case, it is desirable to configure the positive lens component as a cemented lens component which consists, for example, of a negative lens element and a positive lens element.

Out of objective lens systems for microscopes, certain ones are not exchanged with others, but configured to change working distances by moving lens units which compose the objective lens systems. It is desirable that an objective lens system of this type has a distance as measured from a tip thereof to an object which is longer than a focal length thereof so that the lens system can have a longer working distance at a certain definite magnification and may be used in a variety of instruments. It is preferable to select a retrofocus type lens system as such an objective lens system.

The objective lens system of the stereoscopic microscope according to the present invention which has another composition is a retrofocus type lens system which comprises, in order from the object side, a first lens unit having a positive refractive power and a second negative lens unit having a negative refractive power. Aberrations can hardly be corrected in the objective lens system of this type since a convex lens component disposed in the first lens unit has a short focal length. According to the present invention, the first lens unit of the objective lens system comprises the lens component which consists of a positive lens element and a negative lens element as described above. Further, it is possible to correct aberrations more favorably by using two cemented lens components. Furthermore, it is possible to correct chromatic aberration favorably by setting cemented surfaces of the two cemented lens components in directions reverse to each other so that one of the cemented lens components produces chromatic aberration which is then corrected by the other cemented lens component.

Further, it is desirable that a total focal length $f_o$ of the objective lens system and a total focal length $f_{o2}$ of the second negative lens unit satisfy the following condition (5):

$$0.17 < -f_{o2}/f_o < 0.64 \tag{5}$$

If the upper limit of 0.64 of the condition (5) is exceeded, the second negative lens unit will have a strong power, thereby making it difficult to correct aberrations favorably. If the lower limit of 0.17 of the condition (5) is exceeded, in contrast, the objective lens system will have a large total length.

Further, it is desirable to use an extraordinarily dispersive glass material for the positive lens elements. When a focal length of the positive lens element made of the extraordinarily dispersive material is represented by $f_{op}$ and a focal length of the first lens unit of the objective lens system is designated by $f_{o1}$, it is desirable to satisfy the following condition (6):

$$f_{op}/f_{o1} < 2.3 \tag{6}$$

If the condition (6) is not satisfied, the extraordinarily dispersive material cannot exhibit an effect of extraordinary dispersion thereof, whereby lateral chromatic aberration remains and a contour of an image remains colored.

When the extraordinarily dispersive glass material is used for the positive lens element of the cemented lens component of the first lens unit in the objective lens system, curvature which is low on a cemented surface between the lens element made of the extraordinarily dispersive glass material and the other lens element of the cemented lens component makes it impossible to obtain a sufficient effect of the extraordinary dispersion. If curvature is high on this cemented surface, in contrast, astigmatism will be produced and can hardly be corrected. In order to correct this aberration, it is preferable to use an additional lens component in the first lens unit of the objective lens system. Specifically, it is preferable to compose the first lens unit, in order from the object side, of a meniscus lens component (positive cemented lens component) having a convex surface on the object side, a biconvex lens component (positive cemented lens component) and a biconvex lens component (positive lens component). Further, it is possible to correct chromatic aberration favorably while maintaining the other aberrations favorably by setting cemented surface of two positive cemented lens components in directions reverse to each other so that one of the cemented lens component produces chromatic aberration which is then corrected by the other cemented lens component.

When a focal length of the first lens unit of the objective lens system is represented by $f_{o1}$ and a radius of curvature on the cemented lens component which uses the extraordinary glass material is designated by $r_{oc}$, it is desirable to satisfy the following condition (7):

$$r_{oc}/f_{o1} < 0.7 \tag{7}$$

If the condition (7) is not satisfied, the effect of the extraordinary dispersion cannot be obtained sufficiently, thereby making it difficult to correct the secondary spectra.

The objective lens system of the stereoscopic microscope according to the present invention tends to allow degradation of image qualities to be conspicuous due to misalignment between the first lens unit and the second lens unit as well as an eccentricity of the image side lens component of the first lens unit. When the objective lens unit comprises the two lens units, it is therefore desirable to compose it so as to allow adjustment of eccentricities of the first lens unit and the image side lens component of the second lens unit.

Since the optical system according to the present invention is an eccentric optical system, it is impossible to represent chromatic aberration coefficients for correction of chromatic aberration by the general aberration correcting coefficients. However, the optical system ranging from the objective lens system to the imaging relay optical system of one cycle is not an eccentric optical system and it is possible to represent aberration coefficients for an optical system in which an imaging lens is disposed on an optical axis of the optical system ranging from the objective lens system to the imaging relay optical system of one cycle.

When an offaxial aberration coefficient of the optical system which includes the imaging lens disposed in the optical system which ranges from the objective lens system to the imaging relay optical system of one cycle for the C-line and the F-line is represented by PLC and an offaxial aberration coefficient for the d-line and the F-line is designated by SLC, it is desirable that these aberration coefficients satisfy the following conditions (8) and (9):

$$-0.05 < PLC < 0.05 \tag{8}$$

$$-0.05 < SLC < 0.05 \tag{9}$$

wherein the imaging lens is assumed to have a focal length of 210 mm, a field number of 21 and an aperture stop diameter of 10 mm, and PLC and SLC are defined by the following formulae:

| | |
|---|---|
| PLC = | $2\mu h_{M1} \{(n_{F1} - n_{C1}) - n_{R1}/n_{R2}(n_{F2} - n_{C2})\}$ |
| SLC = | $2\mu h_{M1} \{(n_{F1} - n_{d1}) - n_{R1}/n_{R2}(n_{F2} - n_{d2})\}$ |
| $\mu$ = | $-1/(2n_{R2}U_2)$ |

In an afocal condition, $\mu$ has a value expressed below:

$$\mu = -1/(2n_{R2}h_{M2})$$

wherein the reference symbols $n_{R1}$ and $n_{R2}$ represent refractive indices of media which exist on a side of incidence and a side of emergence respectively at a corresponding standard wavelength, the reference symbols $n_{F1}$ and $n_{F2}$ designate refractive indices of the media which exist on the side of incidence and the side of emergence respectively for the F-line, the reference symbols $n_{c1}$ and $n_{c2}$ denote refractive indices of the media which exist on the side of incidence and the side of emergence respectively for the C-line, the reference symbols $n_{d1}$ and $n_{d2}$ represent refractive indices of the media which exist on the side of incidence and the side of emergence respectively for the d-line, the reference symbols $h_{M1}$ and $h_{M2}$ designate heights of a marginal ray on the side of incidence and the side of emergency respectively, and the reference symbol $U_2$ denotes an angle of emergence of the marginal ray.

If the condition (8) or (9) is not satisfied, a contour of an image will be colored conspicuously. For example, a contour of an image observed by an eye is colored yellow inward and blue outward, whereby an image observed by both eyes flickers due to overlapping of the colors.

Since the stereoscopic microscope according to the present invention has an observation optical axis which is eccentric from an objective optical axis as described above, it produces lateral chromatic aberration even on the optical axis. Accordingly, it is important for correcting chromatic aberration in the optical system according to the present invention that lateral chromatic aberration coefficients have small values.

Further, extraordinarily dispersive glass materials have expansion coefficients which are different more largely than those of the ordinary glass materials. When a lens element made of an extraordinarily dispersive material is cemented to a lens component made of an ordinary glass material, the lens elements may be peeled off at an extremely low temperature. In order to prevent such an undesirable phenomenon, it is desirable not to cement these two lens elements but to dispose them with a slight space reserved therebetween.

The stereoscopic microscope according to the present invention is suited for use as a surgical microscope. Therefore, the optical system as a whole is configured so as to be suited for surgical operations as described below:

An optical system of a surgical microscope which is to be used for a surgical operation must have an eye point located near an object while maintaining a working distance required for the surgical operation.

More or less enlargement of a surgical microscope backward and sideward from a location of a surgical operator produce little influences on a surgical operation. It is therefore preferable to form a protrusion from a microscope in a direction which little influences the surgical operation, dispose a vari-focal optical system in the protrusion, lead a light bundle from an object to the vari-focal optical system by using reflecting members and allow the light bundle to emerge from the vicinity of the incident light bundle. By configuring an optical system as described above, it is possible to shorten a distance as measured from a surface of an object to a location of observer's eyes (an eye point). When an optical system comprises an objective lens system, a vari-focal optical system and imaging lenses, however, it is impossible to configure the optical system as described above without using the reflecting members in the vari-focal optical system. When the reflecting members are disposed in the vari-focal optical system, however, errors in eccentricities of the reflecting members influence aberrations in an observation optical system and spaces for disposing the reflecting members must be reserved in the vari-focal optical system, thereby undesirably making it difficult to correct aberrations.

The present invention has solved these problems by disposing an afocal relay optical system for one cycle of imaging after the vari-focal optical system.

Figure 3:
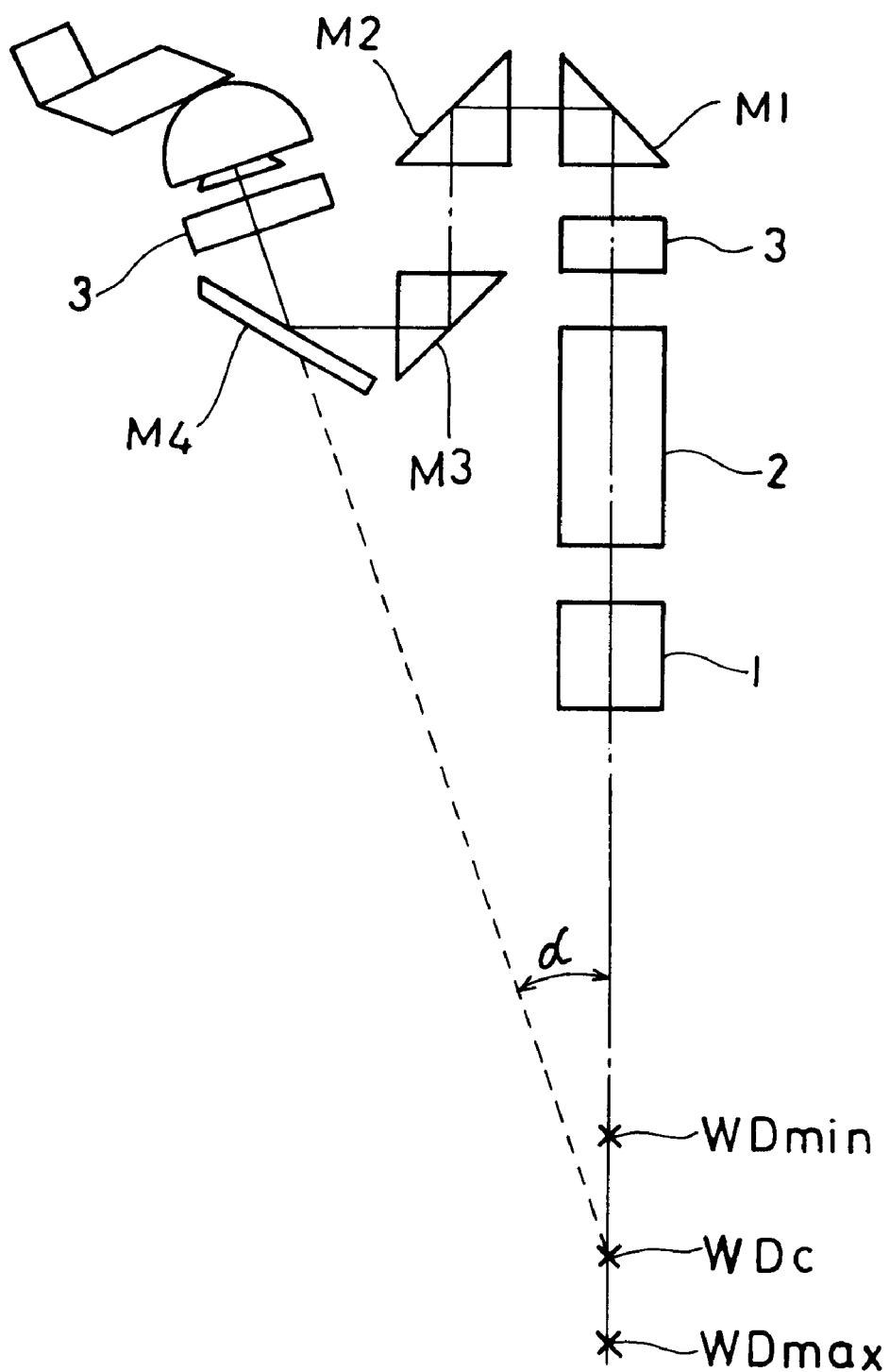
FIG. 3 shows a sectional view illustrating a composition of a stereoscopic microscope according to the present invention which uses four reflecting surfaces.

In order to bring an eye point close to an object by disposing reflecting members in the stereoscopic microscope according to the present invention, it is necessary to dispose four or more reflecting surfaces. A distance from an object to an eye point can be shortened, for example, by reflecting a light bundle four times in the relay optical system as shown in FIG. 3. Specifically, the distance can be shortened by adopting a composition wherein reflecting surfaces $M_1$, $M_2$, $M_3$ and $M_4$ are disposed between an object side lens component and a binocular tube side lens component in the relay optical system as shown in FIG. 3. However, this composition in which an optical axis of incidence on an objective lens system is not aligned with an optical axis of emergence from a relay optical system is not preferable for an operator of the microscope since it gives an operating feeling which is different from that of an ordinary stereoscopic microscope which uses a pair of vari-focal optical systems. This problem can be solved by locating a surface of an object on a straight line extending from the optical axis of emergence of the relay optical system for one cycle of imaging. No problem is posed for operation so far as an angle a formed between an angle of incidence of an objective optical system and the angle of emergence of the relay optical system for one cycle of imaging is within 10°. Further, so far as a working distance (WD) of the objective lens system is variable between a maximum distance ($WD_{max}$) and a minimum distance ($WD_{min}$), it is sufficient to locate an intersection ($WD_c$) between the optical axis of incidence on the objective lens system and the optical axis of emergence of the relay optical system between the $WD_{max}$ and the $WD_{min}$. When the microscope is to be used at a high frequency with a specific working distance, however, it is preferable to set $WD_c$ at the specific working distance. This setting also serves to configure compact an optical system in which a light bundle is reflected in a large number of times.

Figure 4:
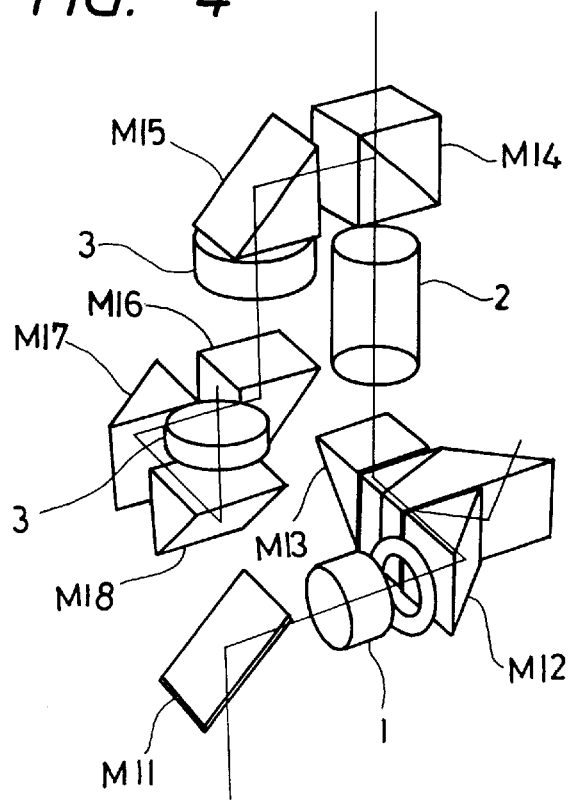
FIG. 4 shows a diagram illustrating a composition of a stereoscopic microscope according to the present invention which uses eight reflecting surfaces.

An optical system which comprises reflecting surfaces $M_{11}$ through $M_{18}$ as shown in FIG. 4, for example, is conceivable as an optical system in which a light bundle is reflected in an increased number of times. The optical system shown in FIG. 4 prevents a focal length from being varied due to a difference between airspaces by making a light bundle afocal in a section between an objective lens system 1 and a vari-focal optical system 2 and in another section between the vari-focal optical system and a relay optical system 3, and disposing reflecting members in the sections wherein the light bundle is afocal. Since a longer optical path in the relay optical system 3 is more preferable for correction of aberrations, an optical path of the relay optical system 3 is prolonged by disposing three reflecting surfaces ($M_{16}$, $M_{17}$ and $M_{18}$) in the optical system shown in FIG. 4.

Further, this optical system is configured to image at least two aperture stops with imaging lens components 5 respectively after the light bundle has emerged from the imaging relay optical system of one cycle as shown in FIG. 1, rotate the images by using reflecting members as occasion demands, magnify the images with the respective eyepieces 7 and allow a stereoscopic image to be observed by right and left eyes. Though a binocular tube which accommodates the imaging lens components, eyepieces, etc. is not shown in FIG. 4, it is possible to obtain a normal stereoscopic image by rotating a binocular tube around an objective optical axis emerging from the relay optical system (axis of revolutional symmetry of a uniaxial optical system) or moving the binocular tube in a direction perpendicular to the objective optical system of the imaging relay optical system within a range where an observation image of the binocular tube is not eclipsed.

Accordingly, it is possible allow a plurality of observers to observe an image in optional directions by splitting a light bundle and changing its direction after is has emerged from the relay optical system 3. In other words, it is possible for a main observer, or a main operator of the microscope, and a plurality of subsidiary observers other than the main observer to observe an image in optional directions respectively.

Now, description will be made of a splitter unit (divided sections on a side of the main observer and on a side of the subsidiary observers) which allows an image to be observed at the same time by the main observer and the plurality of subsidiary observers.

Figure 5:
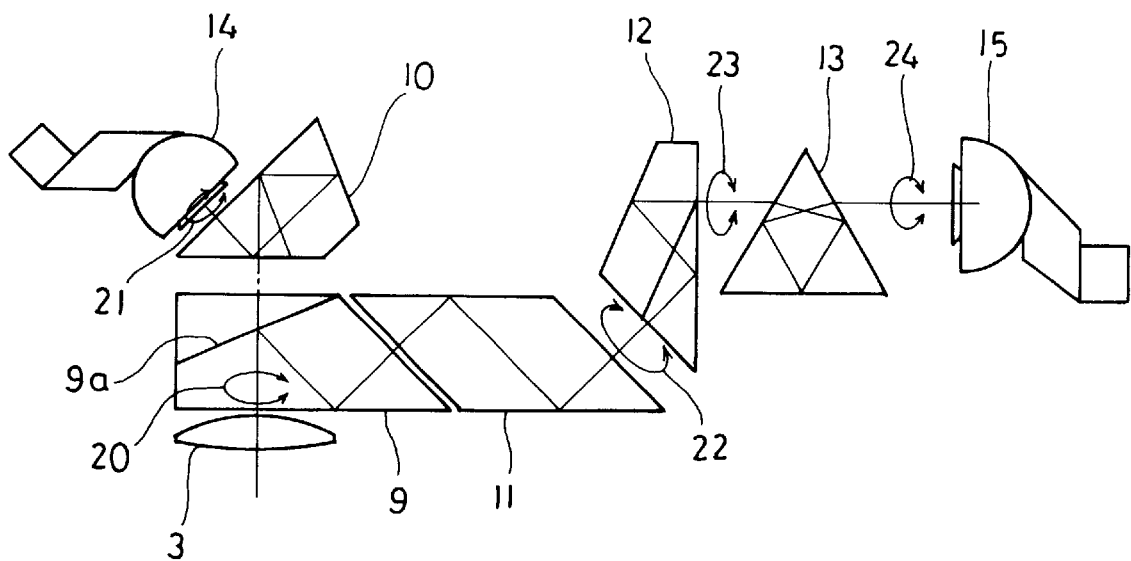
FIG. 5 shows a sectional view illustrating a composition of a splitter section which uses an image rotator for a main observation system and a subsidiary observation system.

FIG. 5 exemplifies a splitter unit for two persons. After emerging from a relay optical system 3, a light bundle is incident on a splitter prism 9 and split by a surface 9a into transmitted rays and reflected rays. The transmitted rays travel toward a main observer who mainly operates the microscope, whereas the reflected rays travel toward a subsidiary observer who is an observer other than the main observer. The rays which have transmitted through the splitter prism 9 pass through a roof prism which reflects the rays four times to rotate an image 180°, whereby a binocular tube 14 on a side of the main observer is usable commonly as a binocular tube of the ordinary stereoscopic microscope which contains separate right and left vari-focal optical systems. On the other hand, the rays which have been reflected by the splitter prism 9 are reflected in the splitter prism 9 and emerge in a direction at 45° relative to the horizontal direction and are incident on a parallelogrammic prism 11. The rays incident on the parallelogrammic prism 11 are reflected twice in this prism and emerge in the direction at 45° relative to the horizontal direction. The parallelogrammic prism 11 is used for reserving a distance between the main observer and the subsidiary observer so that they will not come into collision with each other. Subsequently, rays emerging from the parallelogrammic prism 11 are incident on a roof prism 12 which reflects the rays three times, reflected in the prism and allowed to emerge in the horizontal direction. After an optical axis thus becomes horizontal, the rays are incident on an image rotator prism 13, reflected three times in the image rotator prism 13 and allowed to emerge from the image rotator prism 13 without changing the direction of the optical axis.

In this case, a distance from the relay optical system 3 to an aperture stop on the main observer side is different from a distance from the relay optical system to an aperture stop on the subsidiary observer side. In order to bring these distances close to each other, an aperture stop is disposed on the image side of an imaging lens component in a binocular tube 14 on the main observer side and an aperture stop is disposed on a side of incidence of the image rotator on the subsidiary observer side.

Since it is desirable to keep the main observer side stationary relative to a control section, it is desirable to fix the roof prism which reflects the rays four times. When the microscope body is used in an inclined condition for observing an object which is inclined relative to the horizontal direction, it is preferable to compose a second rotating section of t he binocular tube 14 which is capable of rotating (21) around the optical axis (a second axis of rotation) of the rays which have emerged from the roof prism 10 which reflects the rays four times. However, the microscope has high operability when the binocular tube is rotated within a range of ±30° from a position at which the right and left eyepieces are set horizontal and the roof prism 10 is configured compact to bring the eye point of the main observer close to an object surface.

Further, it is desirable to allow the subsidiary observer side to move so as to locate itself so as to be opposed to the main observer, on the right side and the left of the main observer side. It is possible to change a location of the subsidiary observer side when a first rotating section is composed by integrating the prism 9, the parallelogrammic prism 11, the roof prism 12 which reflects the rays three times, the image rotator 13 and a lens barrel 15 with one another and the first rotating section is rotated (20) around an optical axis of the rays emerging from the relay optical system 3. The main observer side is immovable regardless of the rotation of the subsidiary observer side. When the main observer side is used with the microscope body kept horizontal in a condition shown in FIG. 5 where the subsidiary observer side is located on the right or left side of the main observer side, or when an object set in the vertical direction is to be observed through the main observer side, it is difficult to observe the object since the right and left eyes are located in an up-down direction. The subsidiary observer side is set higher and the lens barrel 15 is moved upward by turning the microscope body (the microscope as a whole) counterclockwise so as to set the microscope body in the horizontal direction for observing, for example, an object which is located on the right side in FIG. 5 and set in the up-down direction (the vertical direction). By rotating a unit of the optical system as a whole on the subsidiary observer side 90° around its rotating axis together with the first rotating section in this condition, the binocular tube 15 is positioned on a side nearer you or an opposite side. In this case, the right and left eyepieces of a binocular tube are set in the up-down (vertical) direction or inconvenient for observation.

In such a case, it is sufficient to integrate the roof prism 12 which reflects the rays three times, the image rotator 13 and the binocular tube 15 to compose a third rotating section which rotates (22) around the optical axis of rays emerging from the parallelogrammic prism 11. This rotating section makes it possible to obtain a condition convenient for observation even when the microscope body is set horizontal. If the optical axis of the emerging rays is not aligned with the axis of rotation (center axis of the binocular tube 15) in this case, a microscopic image is rotated. In other words, a location which is observed at a center of the image in a certain condition moves so as to trace an arc as the axis rotates due to deviation of a center of rotation of the image from the center of the image. However, it is sufficient to adjust only an angle since the light bundle is afocal in this section. Therefore, the adjustment is facilitated when the axis of rotation moves along a spherical surface (moves around a point).

Further, a mechanism which sets the microscope body horizontal is desired since the subsidiary observer must continue observation with his neck kept inclined and is fatigued when the microscope body is inclined at a slight angle. In a case where an object surface is directly observed frequently, it is desired for eliminating a feeling of strangeness to match a direction of a microscopic image with that of an image observed directly. The image rotator can be used for this purpose. Specifically, the image rotator 13 and the binocular tube 15 are integrated with one another to compose a fourth rotating section and this rotating section is rotated at a ratio of a rotating angle 28 of the binocular tube 15 relative to a rotating angle 9 of the rotator 13. In other words, rotations (23) and (24) of the image rotator 13 and the binocular tube 15 are performed around a rotating axis of the fourth rotating section. By rotating the image rotator 13 and the binocular tube 15 as described above, it is possible to match a direction of the directly observed image with that of the microscopic image and adjust so as to keep the right and left eyepiece at the same height. Even when this adjustment is performed, the roof prism 12 which reflects the rays three times, and the image rotator 13 can be configured compact by restricting the rotating angle of the binocular tube.

Figure 6:
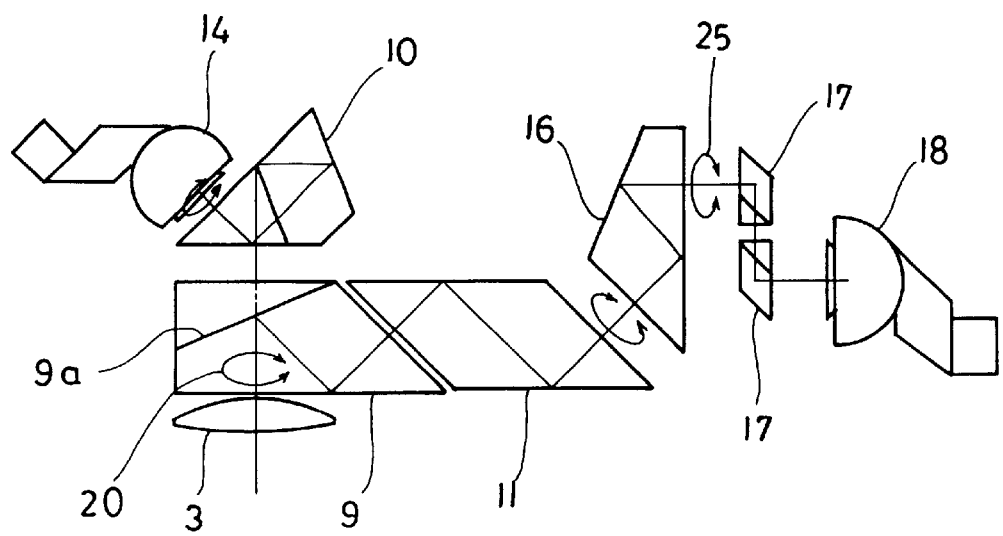
FIG. 6 shows a sectional view illustrating a composition of a splitter section which uses no image rotator for a main observation and a subsidiary observation.

Though operation of the microscope can be facilitated by interposing the image rotator 13, it is delicate to control rotating angles of the image rotator 13 and the binocular tube 15 on the subsidiary observer side. In order to control these rotating angles, the microscope must use a mechanism which requires highly precise workings and is expensive. This mechanism is unnecessary when an object surface is to be directly observed at a low frequency. FIG. 6 shows an example of optical system (another example of splitter unit) which is inexpensive though it is restricted in operability. This optical system uses, in place of the roof prism which reflects the rays three times, a prism 16 which has no roof-shaped reflecting surface and reflects rays twice.

Figure 7:
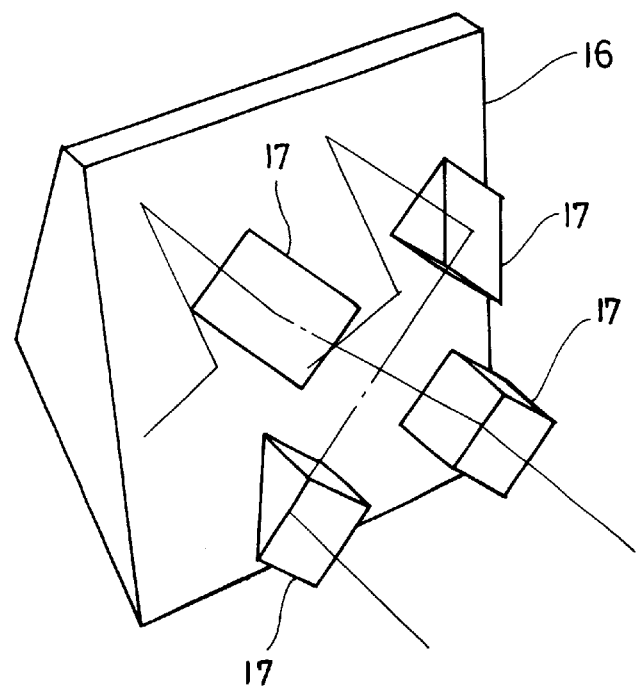
FIG. 7 shows a perspective view illustrating a right-left exchanging member used in the splitter section of the stereoscopic microscope shown in FIG. 6.

The splitter unit shown in FIG. 6 remains unchanged from the splitter unit shown in FIG. 5 with respect to the rotating section which rotates around the second rotating axis, but is different in that the roof prism which reflects the rays three times is replaced with the prism 16 which has no roof shaped reflecting surface and reflects the rays twice, and reflecting sections having four reflecting surfaces in total, or two reflecting surfaces in each of the right and left optical paths for replacing right and left light bundles with each other in place of the image rotator 13 disposed after the reflecting prism. Since the optical system shown in FIG. 6 inverts an image, it preferably uses an inverting binocular tube 18. FIG. 7 shows a perspective view of the reflecting section 17. An optical path indicated by a chain line in FIG. 7 passes through a center between right and left apertures which are determined by the inverting binocular tube and a center of an image surface. Since an image is reversely stereoscopic or a back-forth direction is reversed when the inverting binocular tube 18 is disposed without using the right-left replacing reflector section 17, the optical system adopts a right-left replacing reflector section 17 to avoid reversing the back-forth direction. This optical system can be an optical system which permits optionally selecting directions of observation by rotating (25) the right-left replacing reflector section 17 and the inverting binocular tube 18 as an integral unit.

Certain binocular tubes which are used with stereoscopic microscopes are configured to permit changing inclination angles so as to allow observation in comfortable attitudes. Out of the binocular tubes which permit changing inclination angles, certain one are equipped with image rotators. Such binocular tubes are usable as erecting binocular tubes and also as inverting binocular tubes while rotating image rotators 90° in the binocular tubes. Therefore, these binocular tubes make it unnecessary to prepare two kinds of binocular tubes to be disposed on the main observer side and the subsidiary observer side.

Description will be made of the embodiments of the present invention, those of the uniaxial optical system in particular.

The embodiments of the uniaxial optical system (the optical system consisting of the objective lens system, the vari-focal optical system and the imaging relay optical system of one cycle) have numerical data which is listed below:

| Embodiment 1 |
|---|
| $f = 210$, $FN = 21$, $a = 10$, $D = 21$, $100 < L_R < 200$ |

| | | | |
|---|---|---|---|
| $r_1 = 194.6440$ | | | |
| | $d_1 = 5.000$ | $n_1 = 1.85026$ | $\nu_1 = 32.29$ |
| $r_2 = 117.9840$ | | | |
| | $d_2 = 6.0000$ | $n_2 = 1.47069$ | $\nu_2 = 67.39$ |
| $r_3 = -219.0650$ | | | |
| | $d_3 = 3.0000$ | | |
| $r_4 = \infty$ | | | |
| | $d_4 = 45.0000$ | $n_3 = 1.73348$ | $\nu_3 = 51.70$ |
| $r_5 = \infty$ | | | |
| | $d_5 = 1.5000$ | | |
| $r_6 = \infty$ | | | |
| | $d_6 = 23.5000$ | $n_4 = 1.56883$ | $\nu_4 = 56.33$ |
| $r_7 = \infty$ | | | |
| | $d_7 = 0.5000$ | | |
| $r_8 = \infty$ | | | |
| | $d_8 = 47.0000$ | $n_5 = 1.73348$ | $\nu_5 = 51.70$ |
| $r_9 = \infty$ | | | |
| | $d_9 = 3.0000$ | | |
| $r_{10} = 147.1920$ | | | |
| | $d_{10} = 7.4000$ | $n_6 = 1.49700$ | $\nu_6 = 81.61$ |
| $r_{11} = -78.2270$ | | | |
| | $d_{11} = 4.8000$ | $n_7 = 1.67790$ | $\nu_7 = 50.72$ |
| $r_{12} = 548.9690$ | | | |
| | $d_{12} = 1.1000$ | | |
| $r_{13} = 193.1230$ | | | |
| | $d_{13} = 7.4000$ | $n_8 = 1.51633$ | $\nu_8 = 64.15$ |
| $r_{14} = -162.3200$ | | | |
| | $d_{14} = D_1$ (variable) | | |
| $r_{15} = -111.9960$ | | | |
| | $d_{15} = 2.7000$ | $n_9 = 1.67790$ | $\nu_9 = 55.33$ |
| $r_{16} = 37.2480$ | | | |
| | $d_{16} = 6.2000$ | | |
| $r_{17} = -34.9040$ | | | |
| | $d_{17} = 4.0000$ | $n_{10} = 1.63930$ | $\nu_{10} = 44.87$ |
| $r_{18} = 52.4420$ | | | |
| | $d_{18} = 7.0000$ | $n_{11} = 1.85026$ | $\nu_{11} = 32.29$ |
| $r_{19} = -77.6050$ | | | |
| | $d_{19} = D_2$ (variable) | | |
| $r_{20} = -105.9010$ | | | |
| | $d_{20} = 6.5000$ | $n_{12} = 1.51633$ | $\nu_{12} = 64.15$ |
| $r_{21} = -76.9470$ | | | |
| | $d_{21} = 0.9000$ | | |
| $r_{22} = 188.9930$ | | | |
| | $d_{22} = 4.6000$ | $n_{13} = 1.71736$ | $\nu_{13} = 29.51$ |
| $r_{23} = 89.8590$ | | | |
| | $d_{23} = 7.4000$ | $n_{14} = 1.49700$ | $\nu_{14} = 81.61$ |
| $r_{24} = -103.7990$ | | | |
| | $d_{24} = D_3$ (variable) | | |
| $r_{25} = \infty$ | | | |
| | $d_{25} = 48.0000$ | $n_{15} = 1.51633$ | $\nu_{15} = 64.15$ |
| $r_{26} = \infty$ | | | |
| | $d_{26} = 0.5000$ | | |
| $r_{27} = \infty$ | | | |
| | $d_{27} = 53.0000$ | $n_{16} = 1.56883$ | $\nu_{16} = 56.36$ |
| $r_{28} = \infty$ | | | |
| | $d_{28} = 8.0000$ | | |
| $r_{29} = 162.8011$ | | | |
| | $d_{29} = 7.5000$ | $n_{17} = 1.48749$ | $\nu_{17} = 70.23$ |
| $r_{30} = -142.3810$ | | | |
| | $d_{30} = 3.2000$ | | |
| $r_{31} = 84.4122$ | | | |
| | $d_{31} = 10.5000$ | $n_{18} = 1.49700$ | $\nu_{18} = 81.61$ |
| $r_{32} = -220.5105$ | | | |
| | $d_{32} = 5.7000$ | $n_{19} = 1.71850$ | $\nu_{19} = 33.52$ |
| $r_{33} = 170.8332$ | | | |
| | $d_{33} = 30.5000$ | | |
| $r_{34} = -148.6360$ | | | |
| | $d_{34} = 4.8000$ | $n_{20} = 1.78800$ | $\nu_{20} = 47.37$ |
| $r_{35} = 229.3174$ | | | |
| | $d_{35} = 6.5000$ | $n_{21} = 1.71736$ | $\nu_{21} = 29.51$ |
| $r_{36} = -336.6975$ | | | |
| | $d_{36} = 255.8000$ | | |
| $r_{37} = \infty$ | | | |
| | $d_{37} = 44.0000$ | $n_{22} = 1.56883$ | $\nu_{22} = 56.33$ |

-continued

Embodiment 1

| | | | |
|---|---|---|---|
| $r_{38} = \infty$ | | | |
| | $d_{38} = 1.5000$ | | |
| $r_{39} = 180.8305$ | | | |
| | $d_{39} = 4.5000$ | $n_{23} = 1.72000$ | $\nu_{23} = 41.98$ |
| $r_{40} = 77.0619$ | | | |
| | $d_{40} = 9.5000$ | $n_{24} = 1.49700$ | $\nu_{24} = 81.61$ |
| $r_{41} = -113.0882$ | | | |
| | $d_{41} = 141.7000$ | | |
| $r_{42} = 36.5300$ | | | |
| | $d_{42} = 1.9000$ | $n_{25} = 1.60342$ | $\nu_{25} = 38.03$ |
| $r_{43} = \infty$ | | | |
| | $d_{43} = 5.1000$ | | |
| $r_{44} = 75.2450$ | | | |
| | $d_{44} = 2.4000$ | $n_{26} = 1.51633$ | $\nu_{26} = 64.15$ |
| $r_{45} = -30.3850$ | | | |
| | $d_{45} = 1.6000$ | $n_{27} = 1.58144$ | $\nu_{27} = 40.75$ |
| $r_{46} = 30.3850$ | | | |

| | Low magnification | Medium magnification | High magnification |
|---|---|---|---|
| object distance | 301.0457 | 301.0457 | 301.0457 |
| $D_1$ | 5.31488 | 69.84908 | 102.11889 |
| $D_2$ | 42.72956 | 30.28495 | 5.38988 |
| $D_3$ | 65.95555 | 13.86596 | 6.49123 |

$f_{V1} = 178.8$, $L_V = 170$, $f_{V1}/L_V = 1.05$
$f_{p1} = 103.9$, $f_{V1} = 178.8$, $f_{p1}/f_{V1} = 0.58$
$f_{p3} = 98.2$, $f_{V3} = 164.6$, $f_{p3}/f_{V3} = 0.6$

Embodiment 2

$f = 210$, $FN = 21$, $a = 10$, $D = 21$, $100 < L_R < 200$

| | | | |
|---|---|---|---|
| $r_1 = 292.3170$ | | | |
| | $d_1 = 6.2533$ | $n_1 = 1.68893$ | $\nu_1 = 31.07$ |
| $r_2 = 122.3359$ | | | |
| | $d_2 = 13.5000$ | $n_2 = 1.49700$ | $\nu_2 = 81.54$ |
| $r_3 = -135.1012$ | | | |
| | $d_3 = 0.2000$ | | |
| $r_4 = 152.4242$ | | | |
| | $d_4 = 12.7680$ | $n_3 = 1.58913$ | $\nu_3 = 61.14$ |
| $r_5 = -89.5452$ | | | |
| | $d_5 = 6.2797$ | $n_4 = 1.72342$ | $\nu_4 = 37.95$ |
| $r_6 = -258.5163$ | | | |
| | $d_6 = D_1$ (variable) | | |
| $r_7 = -198.8512$ | | | |
| | $d_7 = 5.0000$ | $n_5 = 1.63930$ | $\nu_5 = 44.88$ |
| $r_8 = 44.8992$ | | | |
| | $d_8 = 5.0000$ | $n_6 = 1.78472$ | $\nu_6 = 25.68$ |
| $r_9 = 91.4004$ | | | |
| | $d_9 = D_2$ (variable) | | |
| $r_{10} = \infty$ | | | |
| | $d_{10} = 45.0000$ | $n_7 = 1.73348$ | $\nu_7 = 51.70$ |
| $r_{11} = \infty$ | | | |
| | $d_{11} = 1.5000$ | | |
| $r_{12} = \infty$ | | | |
| | $d_{12} = 23.5000$ | $n_8 = 1.56883$ | $\nu_8 = 56.33$ |
| $r_{13} = \infty$ | | | |
| | $d_{13} = 0.5000$ | | |
| $r_{14} = \infty$ | | | |
| | $d_{14} = 47.0000$ | $n_9 = 1.73348$ | $\nu_9 = 51.70$ |
| $r_{15} = \infty$ | | | |
| | $d_{15} = 3.0000$ | | |
| $r_{16} = 147.1920$ | | | |
| | $d_{16} = 7.4000$ | $n_{10} = 1.49700$ | $\nu_{10} = 81.61$ |
| $r_{17} = -78.2270$ | | | |
| | $d_{17} = 4.8000$ | $n_{11} = 1.67790$ | $\nu_{11} = 50.72$ |
| $r_{18} = 548.9690$ | | | |
| | $d_{18} = 1.1000$ | | |
| $r_{19} = 193.1230$ | | | |
| | $d_{19} = 7.4000$ | $n_{12} = 1.51633$ | $\nu_{12} = 64.15$ |

-continued

Embodiment 2

| | | | |
|---|---|---|---|
| $r_{20} = -162.3200$ | | | |
| | $d_{20} = D_3$ (variable) | | |
| $r_{21} = -111.9960$ | | | |
| | $d_{21} = 2.7000$ | $n_{13} = 1.67790$ | $\nu_{13} = 55.33$ |
| $r_{22} = 37.2480$ | | | |
| | $d_{22} = 6.2000$ | | |
| $r_{23} = -34.9040$ | | | |
| | $d_{23} = 4.0000$ | $n_{14} = 1.63930$ | $\nu_{14} = 44.87$ |
| $r_{24} = 52.4420$ | | | |
| | $d_{24} = 7.0600$ | $n_{15} = 1.85026$ | $\nu_{15} = 32.29$ |
| $r_{25} = -77.6050$ | | | |
| | $d_{25} = D_4$ (variable) | | |
| $r_{26} = -105.9010$ | | | |
| | $d_{26} = 6.5000$ | $n_{16} = 1.51633$ | $\nu_{16} = 64.15$ |
| $r_{27} = -76.9470$ | | | |
| | $d_{27} = 0.9000$ | | |
| $r_{28} = 188.9930$ | | | |
| | $d_{28} = 4.6000$ | $n_{17} = 1.71736$ | $\nu_{17} = 29.51$ |
| $r_{29} = 89.8590$ | | | |
| | $d_{29} = 7.4000$ | $n_{18} = 1.49700$ | $\nu_{18} = 81.61$ |
| $r_{30} = -103.7990$ | | | |
| | $d_{30} = D_5$ (variable) | | |
| $r_{31} = \infty$ | | | |
| | $d_{31} = 48.0000$ | $n_{19} = 1.51633$ | $\nu_{19} = 64.15$ |
| $r_{32} = \infty$ | | | |
| | $d_{32} = 0.5000$ | | |
| $r_{33} = \infty$ | | | |
| | $d_{33} = 11.5000$ | $n_{20} = 1.56883$ | $\nu_{20} = 56.36$ |
| $r_{34} = \infty$ | | | |
| | $d_{34} = 53.0000$ | $n_{21} = 1.56883$ | $\nu_{21} = 56.36$ |
| $r_{35} = \infty$ | | | |
| | $d_{35} = 8.3598$ | | |
| $r_{36} = 161.2030$ | | | |
| | $d_{36} = 7.5000$ | $n_{22} = 1.48749$ | $\nu_{22} = 70.23$ |
| $r_{37} = -161.2030$ | | | |
| | $d_{37} = 3.2000$ | | |
| $r_{38} = 85.2950$ | | | |
| | $d_{38} = 10.5000$ | $n_{23} = 1.49700$ | $\nu_{23} = 81.61$ |
| $r_{39} = -270.1540$ | | | |
| | $d_{39} = 5.7000$ | $n_{24} = 1.71850$ | $\nu_{24} = 33.52$ |
| $r_{40} = 196.5430$ | | | |
| | $d_{40} = 30.5000$ | | |
| $r_{41} = -215.4780$ | | | |
| | $d_{41} = 4.8000$ | $n_{25} = 1.78800$ | $\nu_{25} = 47.37$ |
| $r_{42} = 273.9820$ | | | |
| | $d_{42} = 6.5000$ | $n_{26} = 1.71736$ | $\nu_{26} = 29.51$ |
| $r_{43} = \infty$ | | | |
| | $d_{43} = 255.4402$ | | |
| $r_{44} = \infty$ | | | |
| | $d_{44} = 44.0000$ | $n_{27} = 1.56883$ | $\nu_{27} = 56.33$ |
| $r_{45} = \infty$ | | | |
| | $d_{45} = 1.5000$ | | |
| $r_{46} = 173.9160$ | | | |
| | $d_{46} = 4.5000$ | $n_{28} = 1.72000$ | $\nu_{28} = 41.98$ |
| $r_{47} = 75.9240$ | | | |
| | $d_{47} = 9.5000$ | $n_{29} = 1.49700$ | $\nu_{29} = 81.61$ |
| $r_{48} = -116.6930$ | | | |
| | $d_{48} = 135.5000$ | | |

| | Low magnification | | |
|---|---|---|---|
| object distance | 335.24726 | 385.31739 | 465.67794 |
| $D_1$ | 22.10000 | 13.97368 | 5.50104 |
| $D_2$ | 8.75222 | 16.87854 | 25.35118 |
| $D_3$ | 5.31488 | 5.31488 | 5.31488 |
| $D_4$ | 42.72956 | 42.72956 | 42.72956 |
| $D_5$ | 65.95555 | 65.95555 | 65.95555 |

| | Medium magnification | | |
|---|---|---|---|
| object distance | 335.24726 | 385.31739 | 465.67794 |
| $D_1$ | 22.10000 | 13.97368 | 5.50104 |
| $D_2$ | 8.75222 | 16.87854 | 25.35118 |
| $D_3$ | 69.84908 | 69.84908 | 69.84908 |
| $D_4$ | 30.28495 | 30.28495 | 30.28495 |
| $D_5$ | 13.86596 | 13.86596 | 13.86596 |

-continued

Embodiment 2

| | High magnification | | |
|---|---|---|---|
| object distance | 335.24726 | 385.31739 | 465.67794 |
| $D_1$ | 22.10000 | 13.97368 | 5.50104 |
| $D_2$ | 8.75222 | 16.87854 | 25.35118 |
| $D_3$ | 102.11889 | 102.11889 | 102.11889 |
| $D_4$ | 5.38988 | 5.38988 | 5.38988 |
| $D_5$ | 6.49123 | 6.49123 | 6.49123 |

$f_{v1} = 178.8$, $L_v = 170$, $f_{v1}/L_v = 1.05$
$f_{p1} = 103.9$, $f_{v1} = 178.8$, $f_{p1}/f_{v1} = 0.58$
$f_{p3} = 98.2$, $f_{v3} = 164.6$, $f_{p3}/f_{v3} = 0.6$
$f_{02} = -116$, $f_0 = 264\sim404$ (variable), $-f_{02}/f_0 = 0.287\sim0.439$
$f_{0p} = 131$, $f_{01} = 107$, $f_{0p}/f_{01} = 1.22$

Embodiment 3

$f = 210$, $FN = 21$, $a = 10$, $D = 21$, $100 < L_R < 200$

| | | | |
|---|---|---|---|
| $r_1 = 89.4060$ | | | |
| | $d_1 = 12.2000$ | $n_1 = 1.58313$ | $v_1 = 59.38$ |
| $r_2 = -643.1940$ | | | |
| | $d_2 = 7.3000$ | $n_2 = 1.57501$ | $v_2 = 41.50$ |
| $r_3 = 83.6390$ | | | |
| | $d_3 = 7.0000$ | | |
| $r_4 = <207.8170$ | | | |
| | $d_4 = 6.4000$ | $n_3 = 1.54814$ | $v_3 = 45.79$ |
| $r_5 = 59.5930$ | | | |
| | $d_5 = 14.6000$ | $n_4 = 1.49700$ | $v_4 = 81.61$ |
| $r_6 = -190.4070$ | | | |
| | $d_6 = 0.2000$ | | |
| $r_7 = 148.2540$ | | | |
| | $d_7 = 7.1000$ | $n_5 = 1.58913$ | $v_5 = 61.18$ |
| $r_8 = -476.9890$ | | | |
| | $d_8 = D_1$ (variable) | | |
| $r_9 = -198.7730$ | | | |
| | $d_9 = 5.0000$ | $n_6 = 1.63930$ | $v_6 = 44.88$ |
| $r_{10} = 47.5730$ | | | |
| | $d_{10} = 5.0000$ | $n_7 = 1.78472$ | $v_7 = 25.68$ |
| $r_{11} = 98.5510$ | | | |
| | $d_{11} = D_2$ (variable) | | |
| $r_{12} = \infty$ | | | |
| | $d_{12} = 45.0000$ | $n_8 = 1.73348$ | $v_8 = 51.70$ |
| $r_{13} = \infty$ | | | |
| | $d_{13} = 1.5000$ | | |
| $r_{14} = \infty$ | | | |
| | $d_{14} = 23.5000$ | $n_9 = 1.56883$ | $v_9 = 56.33$ |
| $r_{15} = \infty$ | | | |
| | $d_{15} = 0.5000$ | | |
| $r_{16} = \infty$ | | | |
| | $d_{16} = 47.0000$ | $n_{10} = 1.73348$ | $v_{10} = 51.70$ |
| $r_{17} = \infty$ | | | |
| | $d_{17} = 3.0000$ | | |
| $r_{18} = 147.1920$ | | | |
| | $d_{18} = 7.4000$ | $n_{11} = 1.49700$ | $v_{11} = 81.61$ |
| $r_{19} = -78.2270$ | | | |
| | $d_{19} = 4.8000$ | $n_{12} = 1.67790$ | $v_{12} = 50.72$ |
| $r_{20} = 548.9690$ | | | |
| | $d_{20} = 1.1000$ | | |
| $r_{21} = 193.1230$ | | | |
| | $d_{21} = 7.4000$ | $n_{13} = 1.51633$ | $v_{13} = 64.15$ |
| $r_{22} = -162.3200$ | | | |
| | $d_{22} = D_3$ (variable) | | |
| $r_{23} = -111.9960$ | | | |
| | $d_{23} = 2.7000$ | $n_{14} = 1.67790$ | $v_{14} = 55.33$ |
| $r_{24} = 37.2480$ | | | |
| | $d_{24} = 6.2000$ | | |
| $r_{25} = -34.9040$ | | | |
| | $d_{25} = 4.0000$ | $n_{15} = 1.63930$ | $v_{15} = 44.87$ |
| $r_{26} = 52.4420$ | | | |
| | $d_{26} = 7.0000$ | $n_{16} = 1.85026$ | $v_{16} = 32.29$ |
| $r_{27} = -77.6050$ | | | |

-continued

Embodiment 3

| | | | |
|---|---|---|---|
| | $d_{27} = D_4$ (variable) | | |
| $r_{28} = -105.9010$ | | | |
| | $d_{28} = 6.5000$ | $n_{17} = 1.51633$ | $v_{17} = 64.15$ |
| $r_{29} = -76.9470$ | | | |
| | $d_{29} = 0.9000$ | | |
| $r_{30} = 188.9930$ | | | |
| | $d_{30} = 4.6000$ | $n_{18} = 1.71736$ | $v_{18} = 29.51$ |
| $r_{31} = 89.8590$ | | | |
| | $d_{31} = 7.4000$ | $n_{19} = 1.49700$ | $v_{19} = 81.61$ |
| $r_{32} = -103.7990$ | | | |
| | $d_{32} = D_5$ (variable) | | |
| $r_{33} = \infty$ | | | |
| | $d_{33} = 48.0000$ | $n_{20} = 1.51633$ | $v_{20} = 64.15$ |
| $r_{34} = \infty$ | | | |
| | $d_{34} = 0.5000$ | | |
| $r_{35} = \infty$ | | | |
| | $d_{35} = 11.5000$ | $n_{21} = 1.56883$ | $v_{21} = 56.36$ |
| $r_{36} = \infty$ | | | |
| | $d_{36} = 53.0000$ | $n_{22} = 1.56883$ | $v_{22} = 56.36$ |
| $r_{37} = \infty$ | | | |
| | $d_{37} = 8.3598$ | | |
| $r_{38} = 161.2030$ | | | |
| | $d_{38} = 7.5000$ | $n_{23} = 1.48749$ | $v_{23} = 70.23$ |
| $r_{39} = -161.2030$ | | | |
| | $d_{39} = 3.2000$ | | |
| $r_{40} = 85.2950$ | | | |
| | $d_{40} = 10.5000$ | $n_{24} = 1.49700$ | $v_{24} = 81.61$ |
| $r_{41} = -270.1540$ | | | |
| | $d_{41} = 5.7000$ | $n_{25} = 1.71850$ | $v_{25} = 33.52$ |
| $r_{42} = 196.5430$ | | | |
| | $d_{42} = 30.5000$ | | |
| $r_{43} = -215.4780$ | | | |
| | $d_{43} = 4.8000$ | $n_{26} = 1.78800$ | $v_{26} = 47.37$ |
| $r_{44} = 273.9820$ | | | |
| | $d_{44} = 6.5000$ | $n_{27} = 1.71736$ | $v_{27} = 29.51$ |
| $r_{45} = \infty$ | | | |
| | $d_{45} = 255.4402$ | | |
| $r_{46} = \infty$ | | | |
| | $d_{46} = 44.0000$ | $n_{28} = 1.56883$ | $v_{28} = 56.33$ |
| $r_{47} = \infty$ | | | |
| | $d_{47} = 1.5000$ | | |
| $r_{48} = 173.9160$ | | | |
| | $d_{48} = 4.5000$ | $n_{29} = 1.72000$ | $v_{29} = 41.98$ |
| $r_{49} = 75.9240$ | | | |
| | $d_{49} = 9.5000$ | $n_{30} = 1.49700$ | $v_{30} = 81.61$ |
| $r_{50} = -116.6930$ | | | |
| | $d_{50} = 135.5000$ | | |

| | Low magnification | | |
|---|---|---|---|
| object distance | 335.62073 | 384.21956 | 465.55108 |
| $D_1$ | 23.36387 | 14.67845 | 5.15591 |
| $D_2$ | 11.33957 | 20.02155 | 29.54409 |
| $D_3$ | 5.31488 | 5.31488 | 5.31488 |
| $D_4$ | 42.72956 | 42.72956 | 42.72956 |
| $D_5$ | 65.95555 | 65.95555 | 65.95555 |
| | Medium magnification | | |
| object distance | 335.62073 | 385.21956 | 465.55108 |
| $D_1$ | 23.36387 | 14.67845 | 5.15591 |
| $D_2$ | 11.33957 | 20.02155 | 29.54409 |
| $D_3$ | 69.84908 | 69.84908 | 69.84908 |
| $D_4$ | 30.28495 | 30.28495 | 30.28495 |
| $D_5$ | 13.86596 | 13.86596 | 13.86596 |
| | High magnification | | |
| object distance | 335.62073 | 384.21956 | 465.55108 |
| $D_1$ | 23.36387 | 14.67845 | 5.15591 |
| $D_2$ | 11.33957 | 20.02155 | 29.54409 |
| $D_3$ | 102.11889 | 102.11889 | 102.11889 |
| $D_4$ | 5.38988 | 5.38988 | 5.38988 |
| $D_5$ | 6.49123 | 6.49123 | 6.49123 |

$f_{v1} = 178.8$, $L_v = 170$, $f_{v1}/L_v = 1.05$
$f_{p1} = 103.9$, $f_{v1} = 178.8$, $f_{p1}/f_{v1} = 0.58$
$f_{p3} = 98.2$, $f_{v3} = 164.6$, $f_{p3}/f_{v3} = 0.6$
$f_{02} = -122$, $f_0 = 264\sim404$ (variable), $-f_{02}/f_0 = 0.302\sim0.46$ -continued

Embodiment 3

$f_{OP} = 93$,  $f_{O1} = 114$,  $f_{OP}/f_{O1} = 0.82$
$r_{OC} = 59.6$,  $f_{O1} = 114$,  $r_{OC}/f_{O1} = 0.52$

Embodiment 4

$f = 210$, $FN = 21$, $a = 10$, $D = 21$, $100 < L_R < 200$

| | | | |
|---|---|---|---|
| $r_1 = 194.6440$ | | | |
| | $d_1 = 5.0000$ | $n_1 = 1.85026$ | $\nu_1 = 32.29$ |
| $r_2 = 117.9840$ | | | |
| | $d_2 = 6.0000$ | $n_2 = 1.47069$ | $\nu_2 = 67.39$ |
| $r_3 = -219.0650$ | | | |
| | $d_3 = 3.0000$ | | |
| $r_4 = 159.0800$ | | | |
| | $d_4 = 7.0000$ | $n_3 = 1.49700$ | $\nu_3 = 81.61$ |
| $r_5 = -159.0800$ | | | |
| | $d_5 = 5.2500$ | $n_4 = 1.72151$ | $\nu_4 = 29.23$ |
| $r_6 = -482.8075$ | | | |
| | $d_6 = 0.7500$ | | |
| $r_7 = 260.4675$ | | | |
| | $d_7 = 5.2500$ | $n_5 = 1.51633$ | $\nu_5 = 64.15$ |
| $r_8 = \infty$ | | | |
| | $d_8 = D_1$ (variable) | | |
| $r_9 = -296.4600$ | | | |
| | $d_9 = 4.6250$ | $n_6 = 1.67790$ | $\nu_6 = 55.33$ |
| $r_{10} = 29.9050$ | | | |
| | $d_{10} = 9.1250$ | $n_7 = 1.71736$ | $\nu_7 = 29.51$ |
| $r_{11} = 90.6600$ | | | |
| | $d_{11} = 8.7172$ | | |
| $r_{12} = -163.6825$ | | | |
| | $d_{12} = 45.0000$ | $n_8 = 1.67790$ | $\nu_8 = 55.33$ |
| $r_{13} = 163.6825$ | | | |
| | $d_{13} = D_2$ (variable) | | |
| $r_{14} = 257.8950$ | | | |
| | $d_{14} = 4.2500$ | $n_9 = 1.72151$ | $\nu_9 = 29.23$ |
| $r_{15} = 98.1900$ | | | |
| | $d_{15} = 5.7500$ | $n_{10} = 1.49700$ | $\nu_{10} = 81.61$ |
| $r_{16} = -263.4825$ | | | |
| | $d_{16} = 0.6250$ | | |
| $r_{17} = 189.0150$ | | | |
| | $d_{17} = 5.2500$ | $n_{11} = 1.51633$ | $\nu_{11} = 64.15$ |
| $r_{18} = -189.0150$ | | | |
| | $d_{18} = D_3$ (variable) | | |
| $r_{19} = -294.9600$ | | | |
| | $d_{19} = 4.3750$ | $n_{12} = 1.67790$ | $\nu_{12} = 55.33$ |
| $r_{20} = 82.1375$ | | | |
| | $d_{20} = 4.5000$ | $n_{13} = 1.68893$ | $\nu_{13} = 31.07$ |
| $r_{21} = 237.5275$ | | | |
| | $d_{21} = 92.5000$ | | |
| $r_{22} = 5699.5094$ | | | |
| | $d_{22} = 7.5000$ | $n_{14} = 1.51633$ | $\nu_{14} = 64.15$ |
| $r_{23} = -231.3876$ | | | |
| | $d_{23} = 3.2000$ | | |
| $r_{24} = 347.7917$ | | | |
| | $d_{24} = 10.5000$ | $n_{15} = 1.49700$ | $\nu_{15} = 81.61$ |
| $r_{25} = -132.4523$ | | | |
| | $d_{25} = 5.7000$ | $n_{16} = 1.71850$ | $\nu_{16} = 33.52$ |
| $r_{26} = -306.9332$ | | | |
| | $d_{26} = 411.5000$ | | |
| $r_{27} = \infty$ | | | |
| | $d_{27} = 45.0000$ | $n_{17} = 1.56883$ | $\nu_{17} = 56.33$ |
| $r_{28} = \infty$ | | | |
| | $d_{28} = 1.0000$ | | |
| $r_{29} = 297.4236$ | | | |
| | $d_{29} = 4.5000$ | $n_{18} = 1.72000$ | $\nu_{18} = 41.98$ |
| $r_{30} = 99.6391$ | | | |
| | $d_{30} = 9.5000$ | $n_{19} = 1.49700$ | $\nu_{19} = 81.61$ |
| $r_{31} = -118.1992$ | | | |
| | $d_{31} = 183.2000$ | | |

-continued

Embodiment 4

| | Low magnification | Medium magnification | High magnification |
|---|---|---|---|
| object distance | 301.0457 | 301.0457 | 301.0457 |
| $D_1$ | 28.03822 | 72.53694 | 87.70848 |
| $D_2$ | 207.22522 | 112.38700 | 55.77501 |
| $D_3$ | 18.44432 | 68.78382 | 110.22427 |

$f_{V1} = 195$, $L_V = 325$, $f_{V1}/L_V = 0.6$

Embodiment 5

$f = 210$, $FN = 21$, $a = 10$, $D = 21$, $100 < L_R < 200$

| | | | |
|---|---|---|---|
| $r_1 = 194.6440$ | | | |
| | $d_1 = 5.0000$ | $n_1 = 1.85026$ | $\nu_1 = 32.29$ |
| $r_2 = 117.9840$ | | | |
| | $d_2 = 6.0000$ | $n_2 = 1.47069$ | $\nu_2 = 67.39$ |
| $r_3 = -219.0650$ | | | |
| | $d_3 = 3.0000$ | | |
| $r_4 = \infty$ | | | |
| | $d_4 = 45.0000$ | $n_3 = 1.73348$ | $\nu_3 = 51.70$ |
| $r_5 = \infty$ | | | |
| | $d_5 = 1.5000$ | | |
| $r_6 = \infty$ | | | |
| | $d_6 = 23.5000$ | $n_4 = 1.56883$ | $\nu_4 = 56.33$ |
| $r_7 = \infty$ | | | |
| | $d_7 = 0.5000$ | | |
| $r_8 = \infty$ | | | |
| | $d_8 = 47.0000$ | $n_5 = 1.73348$ | $\nu_5 = 51.70$ |
| $r_9 = \infty$ | | | |
| | $d_9 = 3.0000$ | | |
| $r_{10} = 153.4218$ | | | |
| | $d_{10} = 7.4950$ | $n_6 = 1.51633$ | $\nu_7 = 64.15$ |
| $r_{11} = -90.7407$ | | | |
| | $d_{11} = 5.0018$ | $n_7 = 1.72342$ | $\nu_7 = 37.95$ |
| $r_{12} = 592.4132$ | | | |
| | $d_{12} = 0.9866$ | | |
| $r_{13} = 241.3335$ | | | |
| | $d_{13} = 8.0596$ | $n_8 = 1.65000$ | $\nu_8 = 50.00$ |
| $r_{14} = -207.9025$ | | | |
| | $d_{14} = D_1$ (variable) | | |
| $r_{15} = -113.3290$ | | | |
| | $d_{15} = 2.7000$ | $n_9 = 1.67790$ | $\nu_9 = 55.33$ |
| $r_{16} = 37.1199$ | | | |
| | $d_{16} = 6.2000$ | | |
| $r_{17} = -34.8907$ | | | |
| | $d_{17} = 4.0000$ | $n_{10} = 1.63930$ | $\nu_{10} = 44.87$ |
| $r_{18} = 52.4875$ | | | |
| | $d_{18} = 7.0000$ | $n_{11} = 1.85026$ | $\nu_{11} = 32.29$ |
| $r_{19} = -77.5445$ | | | |
| | $d_{19} = D_2$ (variable) | | |
| $r_{20} = -105.4365$ | | | |
| | $d_{20} = 6.5000$ | $n_{12} = 1.51633$ | $\nu_{12} = 64.15$ |
| $r_{21} = -76.5354$ | | | |
| | $d_{21} = 0.9000$ | | |
| $r_{22} = 225.0096$ | | | |
| | $d_{22} = 4.0077$ | $n_{13} = 1.84666$ | $\nu_{13} = 23.78$ |
| $r_{23} = 105.7307$ | | | |
| | $d_{23} = 7.7096$ | $n_{14} = 1.58913$ | $\nu_{14} = 61.14$ |
| $r_{24} = -122.9566$ | | | |
| | $d_{24} = D_3$ (variable) | | |
| $r_{25} = \infty$ | | | |
| | $d_{25} = 48.0000$ | $n_{15} = 1.51633$ | $\nu_{15} = 64.15$ |
| $r_{26} = \infty$ | | | |
| | $d_{26} = 0.5000$ | | |
| $r_{27} = \infty$ | | | |
| | $d_{27} = 11.5000$ | $n_{16} = 1.56883$ | $\nu_{16} = 56.36$ |
| $r_{28} = \infty$ | | | |
| | $d_{28} = 53.0000$ | $n_{17} = 1.56883$ | $\nu_{17} = 56.36$ |
| $r_{29} = \infty$ | | | |
| | $d_{29} = 7.5000$ | | |

-continued

Embodiment 5

| | | | |
|---|---|---|---|
| $r_{30} = 149.3461$ | | | |
| | $d_{30} = 6.2759$ | $n_{18} = 1.48749$ | $v_{18} = 70.23$ |
| $r_{31} = -177.0209$ | | | |
| | $d_{31} = 3.1124$ | | |
| $r_{32} = 99.2295$ | | | |
| | $d_{32} = 11.1241$ | $n_{19} = 1.58913$ | $v_{19} = 61.14$ |
| $r_{33} = -231.5102$ | | | |
| | $d_{33} = 5.9581$ | $n_{20} = 1.80518$ | $v_{20} = 25.42$ |
| $r_{34} = 221.0995$ | | | |
| | $d_{34} = 30.4628$ | | |
| $r_{35} = -275.1741$ | | | |
| | $d_{35} = 4.5350$ | $n_{21} = 1.78800$ | $v_{21} = 47.37$ |
| $r_{36} = 67.0735$ | | | |
| | $d_{36} = 6.2252$ | $n_{22} = 1.71736$ | $v_{22} = 29.51$ |
| $r_{37} = \infty$ | | | |
| | $d_{37} = 255.3064$ | | |
| $r_{38} = \infty$ | | | |
| | $d_{38} = 44.0000$ | $n_{23} = 1.56883$ | $v_{23} = 56.33$ |
| $r_{39} = \infty$ | | | |
| | $d_{39} = 1.5000$ | | |
| $r_{40} = 179.4897$ | | | |
| | $d_{40} = 4.5000$ | $n_{24} = 1.72000$ | $v_{24} = 41.98$ |
| $r_{41} = 76.5695$ | | | |
| | $d_{41} = 9.5000$ | $n_{25} = 1.49700$ | $v_{25} = 81.61$ |
| $r_{42} = -113.7218$ | | | |

| | Low magnification | Medium magnification | High magnification |
|---|---|---|---|
| object distance | 301.0457 | 301.0457 | 301.0457 |
| $D_1$ | 5.26401 | 69.82465 | 102.10761 |
| $D_2$ | 42.72747 | 30.27803 | 5.37332 |
| $D_3$ | 65.44826 | 13.33705 | 5.9588 |

$f_{V1} = 178.9$, $L_V = 170$, $f_{V1}/L_V = 1.05$

Embodiment 6

$f = 210$, $FN = 21$, $a = 10$, $D = 21$, $100 < L_R < 200$

| | | | |
|---|---|---|---|
| $r_1 = 194.6440$ | | | |
| | $d_1 = 5.0000$ | $n_1 = 1.85026$ | $v_1 = 32.29$ |
| $r_2 = 117.9840$ | | | |
| | $d_2 = 6.0000$ | $n_2 = 1.47069$ | $v_2 = 67.39$ |
| $r_3 = -219.0650$ | | | |
| | $d_3 = 3.0000$ | | |
| $r_4 = \infty$ | | | |
| | $d_4 = 45.0000$ | $n_3 = 1.73348$ | $v_3 = 51.70$ |
| $r_5 = \infty$ | | | |
| | $d_5 = 1.5000$ | | |
| $r_6 = \infty$ | | | |
| | $d_6 = 23.5000$ | $n_4 = 1.56883$ | $v_4 = 56.33$ |
| $r_7 = \infty$ | | | |
| | $d_7 = 0.5000$ | | |
| $r_8 = \infty$ | | | |
| | $d_8 = 47.0000$ | $n_5 = 1.73348$ | $v_5 = 51.70$ |
| $r_9 = \infty$ | | | |
| | $d_9 = 3.0000$ | | |
| $r_{10} = 146.7430$ | | | |
| | $d_{10} = 7.4000$ | $n_6 = 1.49700$ | $v_7 = 81.61$ |
| $r_{11} = -78.4106$ | | | |
| | $d_{11} = 4.8000$ | $n_7 = 1.67790$ | $v_7 = 50.72$ |
| $r_{12} = 548.0478$ | | | |
| | $d_{12} = 1.1000$ | | |
| $r_{13} = 193.5329$ | | | |
| | $d_{13} = 7.4000$ | $n_8 = 1.51633$ | $v_8 = 64.15$ |
| $r_{14} = -162.8639$ | | | |
| | $d_{14} = D_1$ (variable) | | |
| $r_{15} = -113.3324$ | | | |
| | $d_{15} = 2.7000$ | $n_9 = 1.67790$ | $v_9 = 55.33$ |
| $r_{16} = 37.3369$ | | | |
| | $d_{16} = 6.2000$ | | |

-continued

Embodiment 6

| | | | |
|---|---|---|---|
| $r_{17} = -34.9156$ | | | |
| | $d_{17} = 4.0000$ | $n_{10} = 1.63930$ | $v_{10} = 44.87$ |
| $r_{18} = 52.7080$ | | | |
| | $d_{18} = 7.0000$ | $n_{11} = 1.85026$ | $v_{11} = 32.29$ |
| $r_{19} = -78.0403$ | | | |
| | $d_{19} = D_2$ (variable) | | |
| $r_{20} = -106.6776$ | | | |
| | $d_{20} = 6.5000$ | $n_{12} = 1.51633$ | $v_{12} = 64.15$ |
| $r_{21} = -76.8218$ | | | |
| | $d_{21} = 0.9000$ | | |
| $r_{22} = 222.4902$ | | | |
| | $d_{22} = 4.6303$ | $n_{13} = 1.84666$ | $v_{13} = 23.78$ |
| $r_{23} = 104.8435$ | | | |
| | $d_{23} = 7.8037$ | $n_{14} = 1.58913$ | $v_{14} = 61.15$ |
| $r_{24} = -124.0649$ | | | |
| | $d_{24} = D_3$ (variable) | | |
| $r_{25} = \infty$ | | | |
| | $d_{25} = 48.0000$ | $n_{15} = 1.51633$ | $v_{15} = 64.15$ |
| $r_{26} = \infty$ | | | |
| | $d_{26} = 0.5000$ | | |
| $r_{27} = \infty$ | | | |
| | $d_{27} = 11.5000$ | $n_{16} = 1.56883$ | $v_{16} = 56.36$ |
| $r_{28} = \infty$ | | | |
| | $d_{28} = 53.0000$ | $n_{17} = 1.56883$ | $v_{17} = 56.36$ |
| $r_{29} = \infty$ | | | |
| | $d_{29} = 7.5000$ | | |
| $r_{30} = 149.1352$ | | | |
| | $d_{30} = 6.2044$ | $n_{18} = 1.48749$ | $v_{18} = 70.23$ |
| $r_{31} = -176.8270$ | | | |
| | $d_{31} = 3.1066$ | | |
| $r_{32} = 99.1202$ | | | |
| | $d_{32} = 11.1225$ | $n_{19} = 1.58913$ | $v_{19} = 61.14$ |
| $r_{33} = -222.2926$ | | | |
| | $d_{33} = 5.9560$ | $n_{20} = 1.80518$ | $v_{20} = 25.42$ |
| $r_{34} = 219.6320$ | | | |
| | $d_{34} = 30.4602$ | | |
| $r_{35} = -280.7827$ | | | |
| | $d_{35} = 4.5225$ | $n_{21} = 1.78800$ | $v_{21} = 47.37$ |
| $r_{36} = 68.8735$ | | | |
| | $d_{36} = 6.2067$ | $n_{22} = 1.71736$ | $v_{22} = 29.51$ |
| $r_{37} = \infty$ | | | |
| | $d_{37} = 255.2972$ | | |
| $r_{38} = \infty$ | | | |
| | $d_{38} = 44.0000$ | $n_{23} = 1.56883$ | $v_{23} = 56.33$ |
| $r_{39} = \infty$ | | | |
| | $d_{39} = 1.5000$ | | |
| $r_{40} = 181.8278$ | | | |
| | $d_{40} = 4.5012$ | $n_{24} = 1.72047$ | $v_{24} = 34.71$ |
| $r_{41} = 73.3745$ | | | |
| | $d_{41} = 9.6227$ | $n_{25} = 1.51633$ | $v_{25} = 64.15$ |
| $r_{42} = -120.0732$ | | | |

| | Low magnification | Medium magnification | High magnification |
|---|---|---|---|
| object distance | 301.0457 | 301.0457 | 301.0457 |
| $D_1$ | 5.27957 | 69.83643 | 102.11753 |
| $D_2$ | 42.7264 | 30.28155 | 5.38599 |
| $D_3$ | 65.56004 | 13.44804 | 6.06249 |

$f_{V1} = 178.9$, $L_V = 170$, $f_{V1}/L_V = 1.05$
$f_{p1} = 104.0$, $f_{V1} = 178.9$, $f_{p1}/f_{V1} = 0.58$ $v_1$ and $v_2$ represent Abbe's numbers of the respective lens components. Further, the reference symbol f represents a focal length of the uniaxial optical system, the reference symbol FN designates a field number, the reference symbol denotes a diameter of an aperture stop, the reference symbol D represents a distance between optical axes of the right and left imaging lens components, and the reference symbol LR designates a distance as measured from an image side surface of the relay optical system to the aperture stop.

Figure 8:
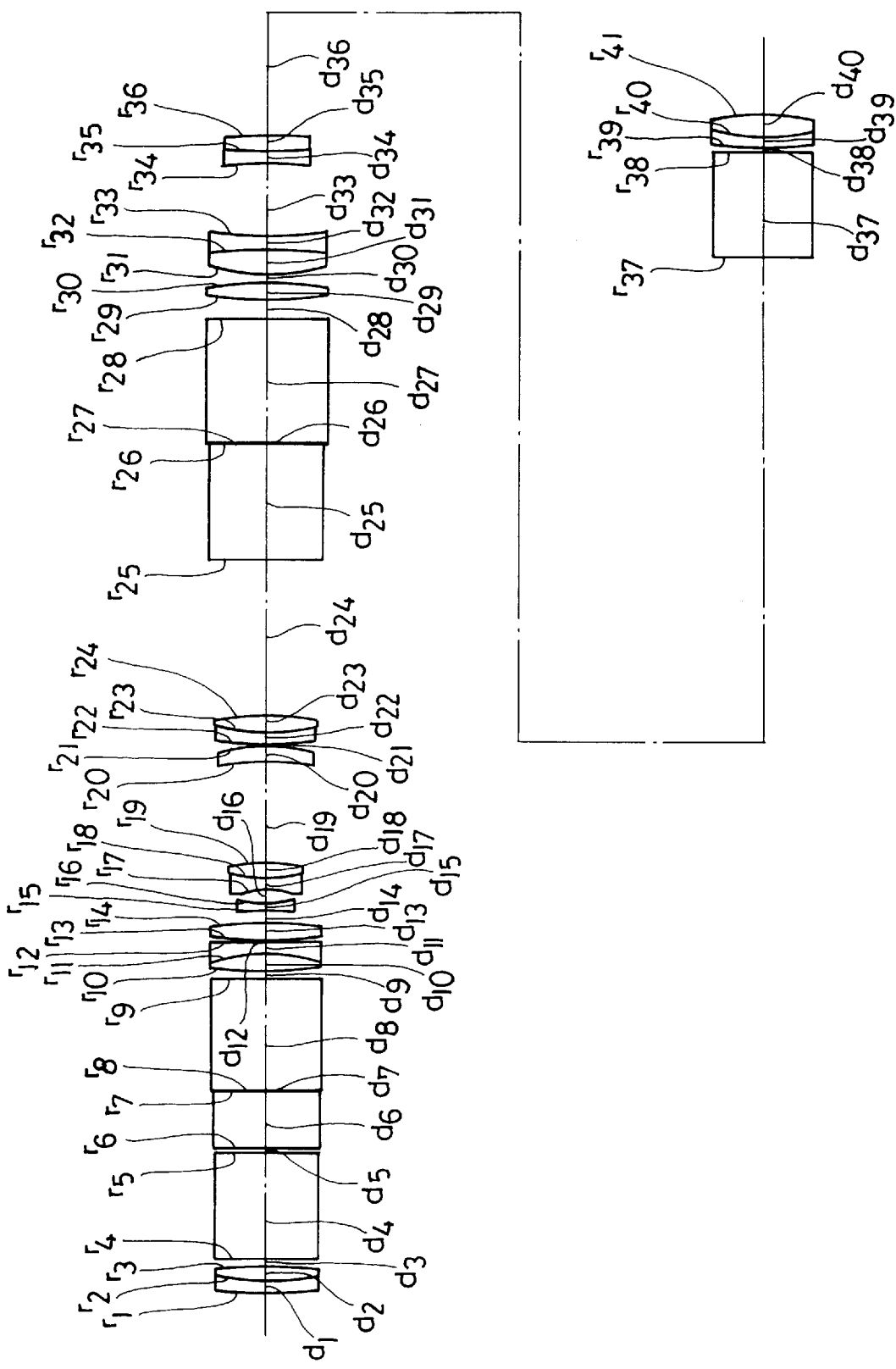
FIG. 8 shows a sectional view illustrating a first embodiment of the stereoscopic microscope according to the present invention when it is set at a magnification of 0.31×.
Figure 9:
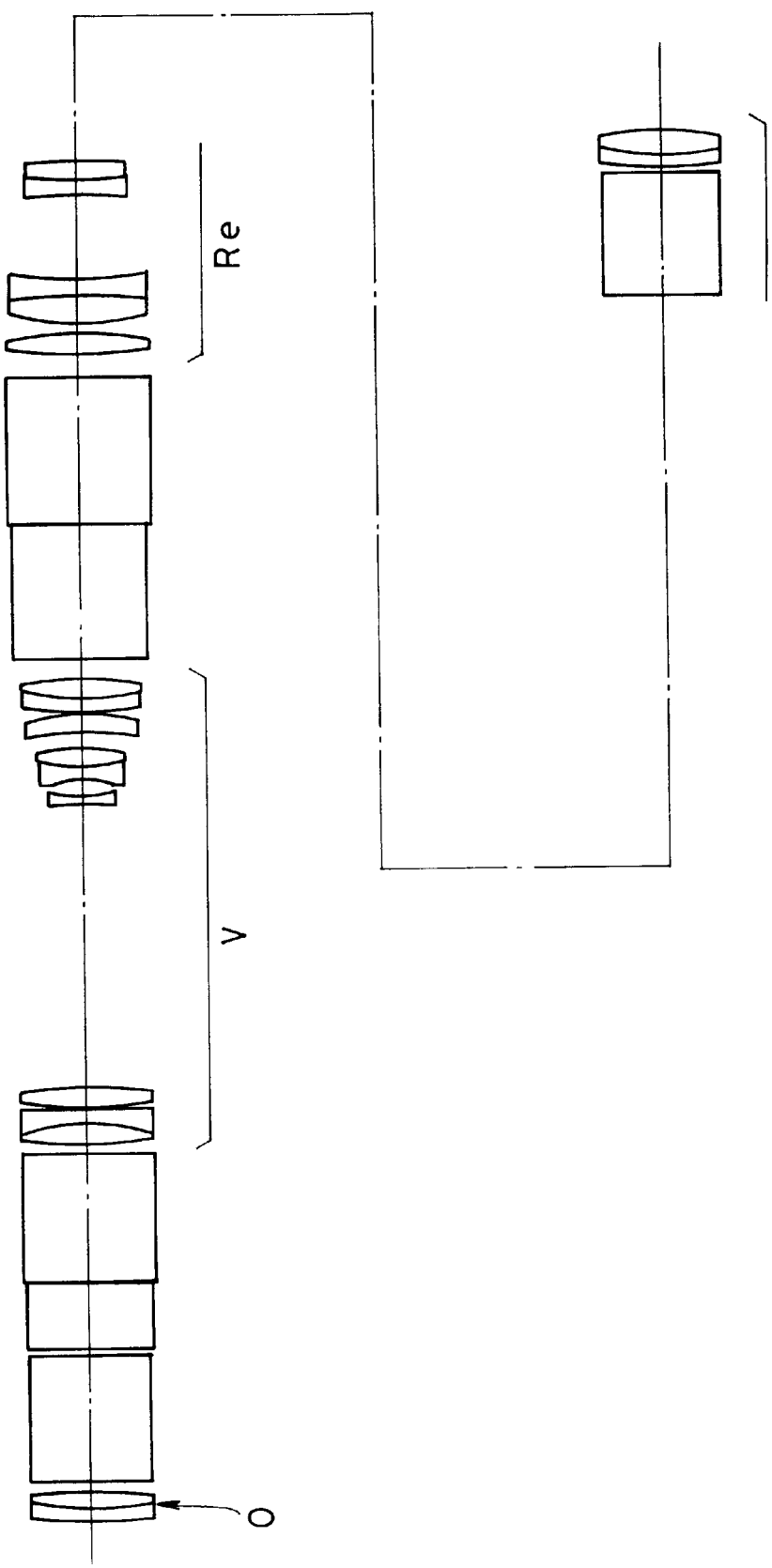
FIG. 9 shows a sectional view illustrating the first embodiment of the stereoscopic microscope according to the present invention when it is set at a magnification of 1.25×.

FIGS. 8 and 9 illustrate a composition of the first embodiment of the stereoscopic microscope. FIG. 8 shows a condition where the stereoscopic microscope is set at a magnification of 0.31× and FIG. 9 shows a condition where the microscope is set at a magnification of 1.25×.

In the first embodiment, an objective lens system comprises a lens component which consists of a negative meniscus lens component and a positive lens component, and a vari-focal optical system is a zoom lens system which comprises a first positive lens unit, a second negative lens unit and a third positive lens unit. Out of these lens units, the first lens unit comprises a meniscus lens component which consists of a positive lens element and a negative lens element, and a positive lens component which consists of a single lens element, the second lens unit comprises a negative lens component which consists of a single lens element, and a meniscus lens component which consists of a negative lens element and a positive lens element, and the third lens unit comprises a lens component which consists of a single lens element, and a positive lens component which consists of a negative meniscus lens element and a positive lens element. Further, the imaging relay optical system of one cycle comprises a positive lens component which consists of a single lens element, a positive meniscus lens component which consists of a positive lens element and a negative lens element, a negative meniscus lens component which consists of a negative lens element and a positive lens element, and a positive lens component which is disposed after an imaging point, and consists of a negative meniscus lens element and a positive lens element. In FIG. 9, a reference symbol 0 represents the objective lens system, a reference symbol V designates the vari-focal optical system and a reference symbol Re denotes the imaging relay optical system of one cycle.

The first embodiment uses an extraordinarily dispersive glass material for the two convex lens components disposed in the first lens unit and the third lens unit respectively of the vari-focal optical system as well as the two convex lens elements which are disposed before and after respectively an imaging point in the relay optical system. Specifically, the biconvex lens element ($r_{10}$ to $r_{11}$) disposed on the object side in the first lens unit of the vari-focal optical system, the biconvex lens element ($r_{23}$ to $r_{24}$) disposed on the image side in the third lens unit of the vari-focal optical system, and the biconvex lens element ($r_{31}$ to $r_{32}$) disposed on the object side in the second lens component of the relay optical system and the biconvex lens component ($r_{40}$ to $r_{41}$) on the image side in the relay optical system are made of an extraordinarily dispersive glass material.

Figure 24:
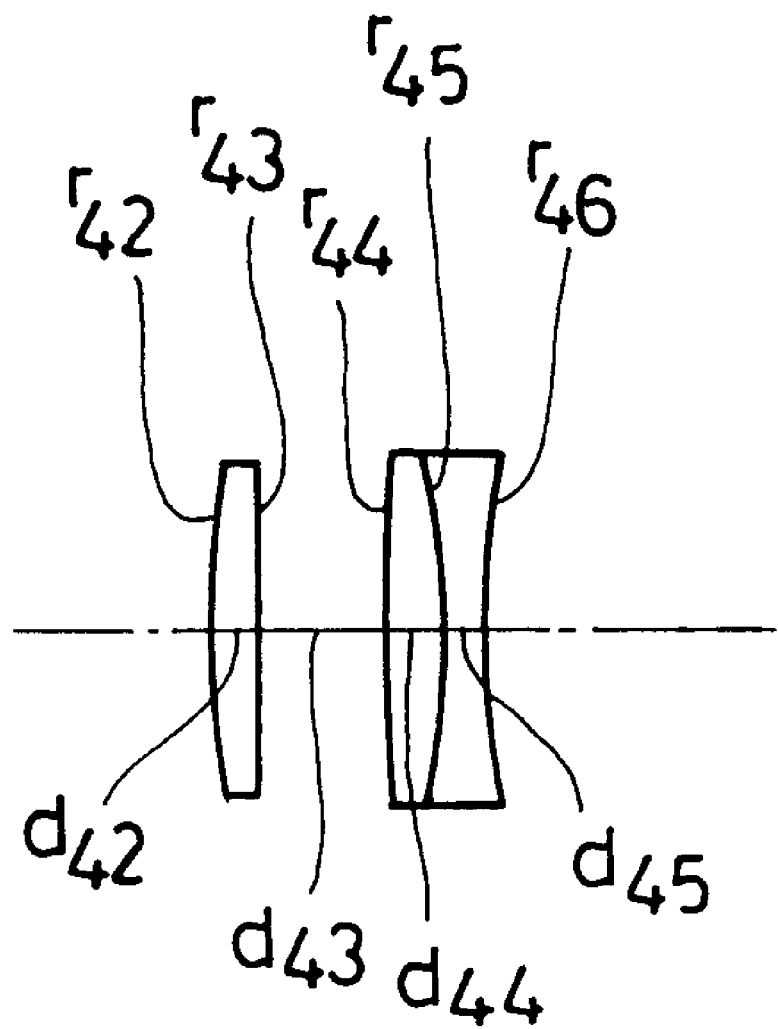
FIG. 24 shows a sectional view illustrating an imaging lens component which is to be disposed after a relay optical system of one cycle in each of the embodiment of the present invention.
Figure 25A:
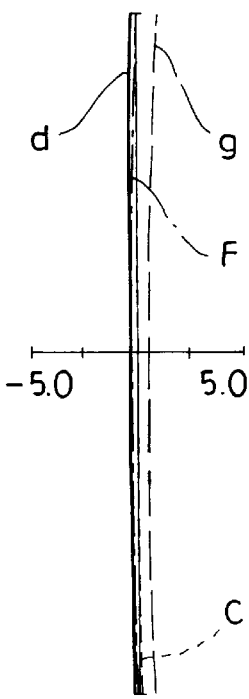
Figure 25B:
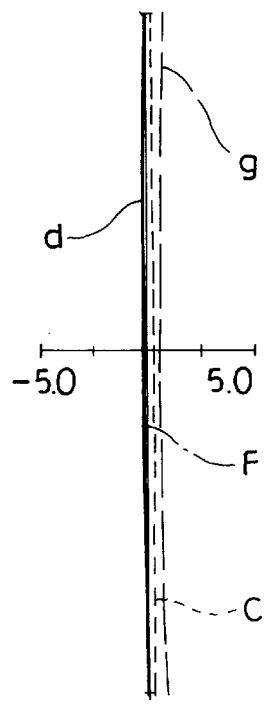
Figure 25C:
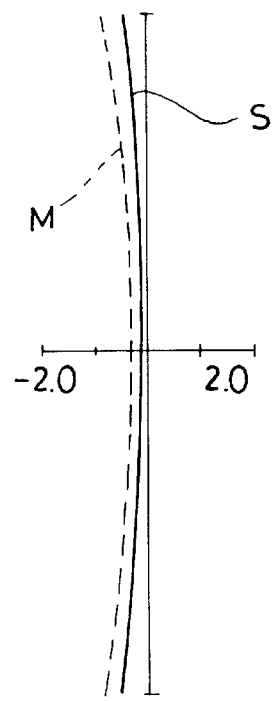
Figure 25D:
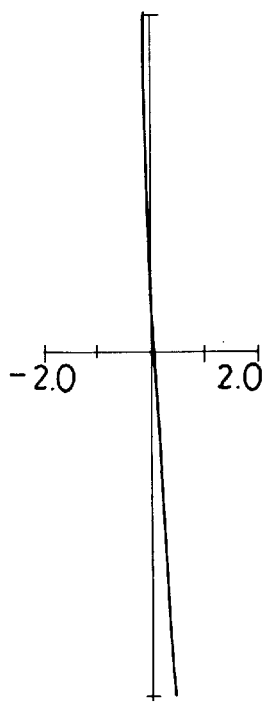
Figure 25E:
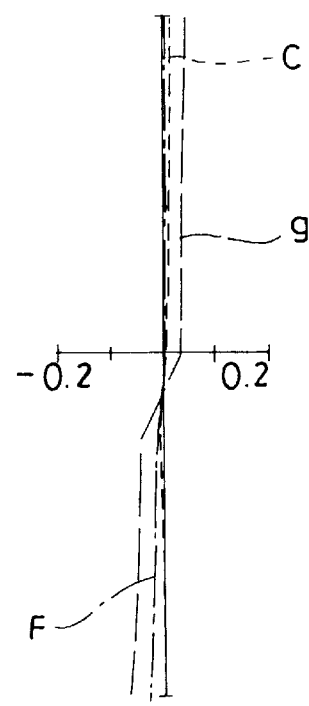

Owing to the fact that the extraordinarily dispersive glass material is used for the lens components mentioned above, the optical system referred as the first embodiment favorably corrects aberrations, the secondary spectra of chromatic aberration in particular, as shown in FIGS. 25A through 25E and 26A through 26E though the uniaxial optical system, the vari-focal optical system in particular, is configured as an eccentric optical system. Out of these drawings, FIGS. 25A through 25E show aberrations at a magnification of 0,31×, whereas FIGS. 26A through 26E show aberrations at a magnification of 1.25× which is set by disposing the imaging lens component shown in FIG. 24. Further, FIGS. 25A and 26A show spherical aberration in the eccentric direction, FIGS. 25B and 26B show spherical aberration in a direction of 90° relative to the eccentric direction, FIGS. 25C and 26C show astigmatism, FIGS. 25D and 26D show distortion, and FIGS. 25E and 26E show lateral chromatic aberration. Out of these drawings, an aperture ratio is 1.0 in FIGS. 25A, 25B, 26A and 26B, and an image height is 10.50 in FIGS. 25C through 25E and FIG. 26C through 26E.

In the numerical data of the first embodiment, the reference symbols $r_{42}$ through $r_{46}$ represent imaging lens components which are disposed after the imaging optical system of one cycle and have a composition shown in FIG. 24. In addition, the reference symbol $d_{4f}$ designates a distance as measured from a final surface of the imaging relay optical system of one cycle to a first surface of the imaging lens component.

Figure 10:
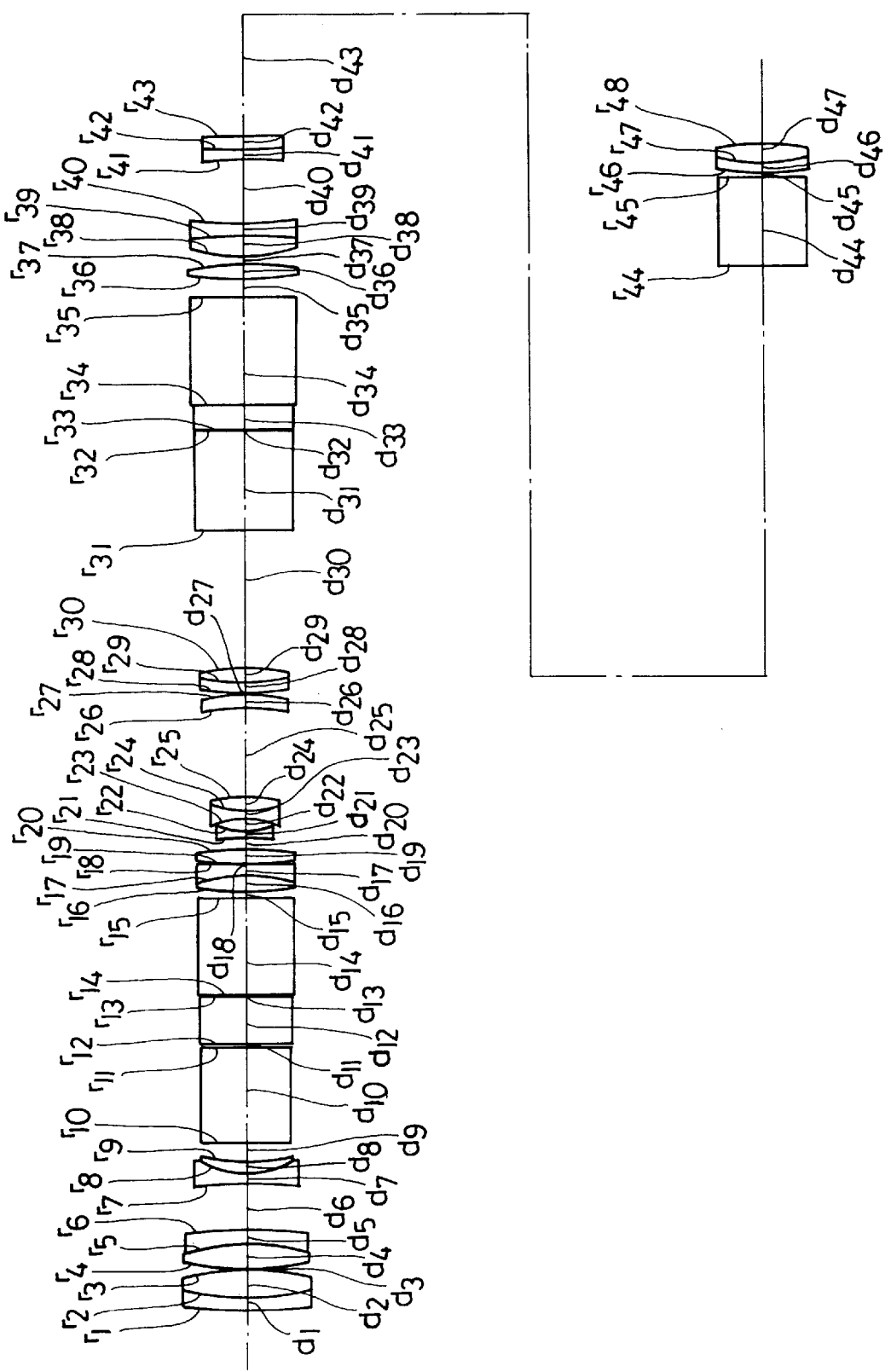
FIG. 10 shows a sectional view illustrating a second embodiment of the stereoscopic microscope according to the present invention when it is set at a magnification of 0.36×.
Figure 11:
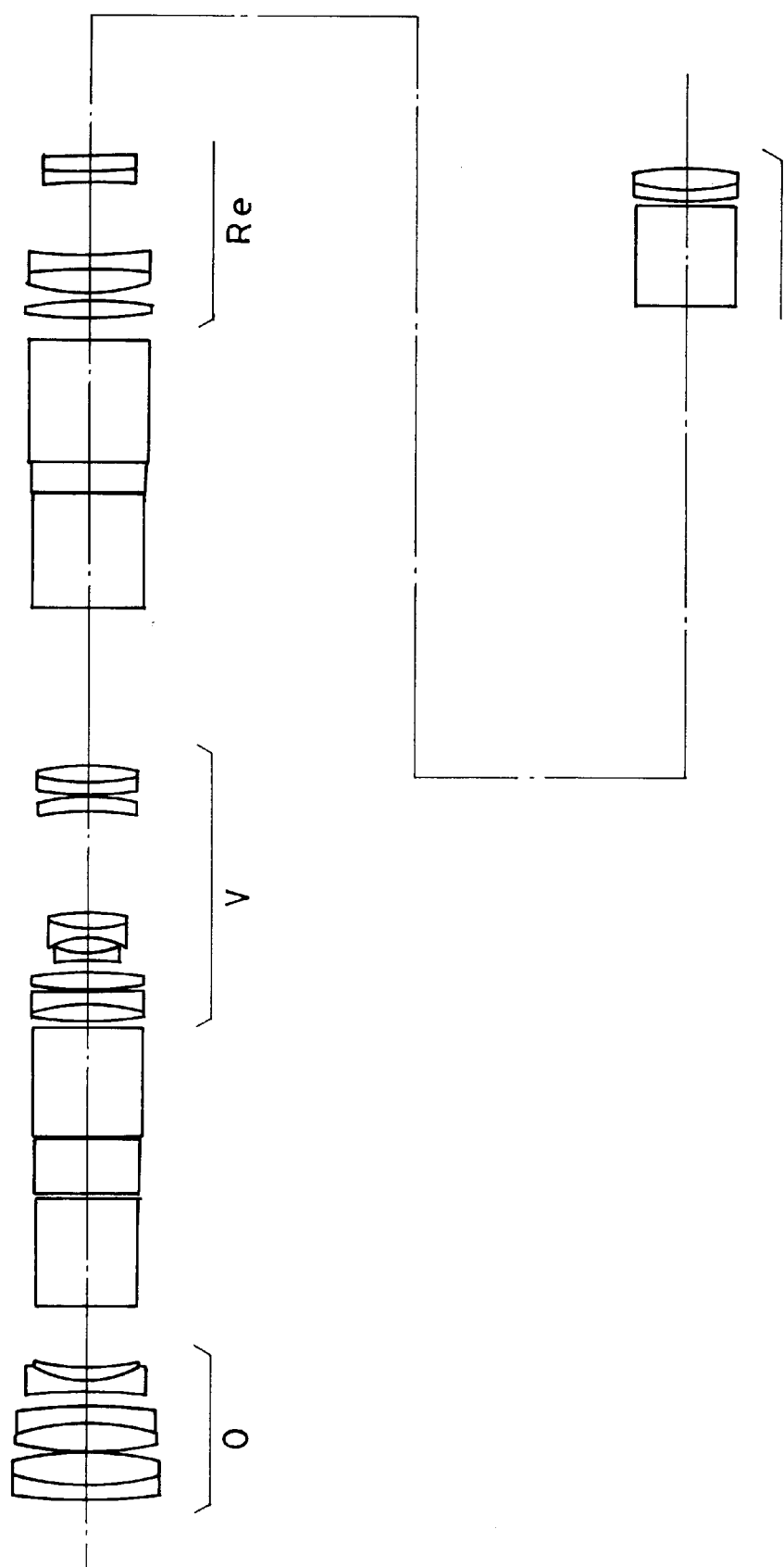
FIG. 11 shows a sectional view illustrating the second embodiment of the present invention when it is set at a magnification of 0.23×.
Figure 12:
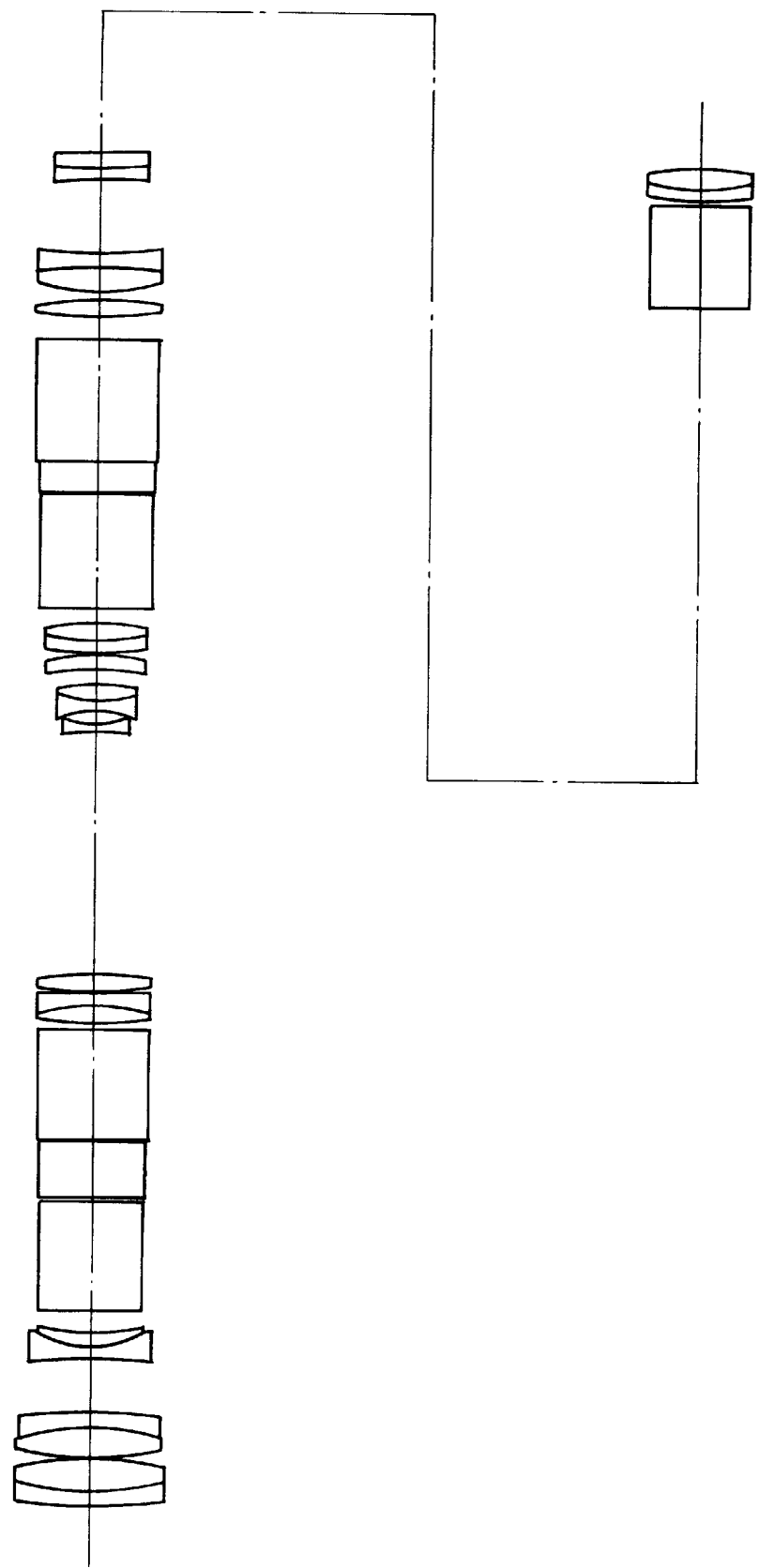
FIG. 12 shows a sectional view illustrating the second embodiment of the stereoscopic microscope according to the present invention when it is set at a magnification of 1.4×.
Figure 13:
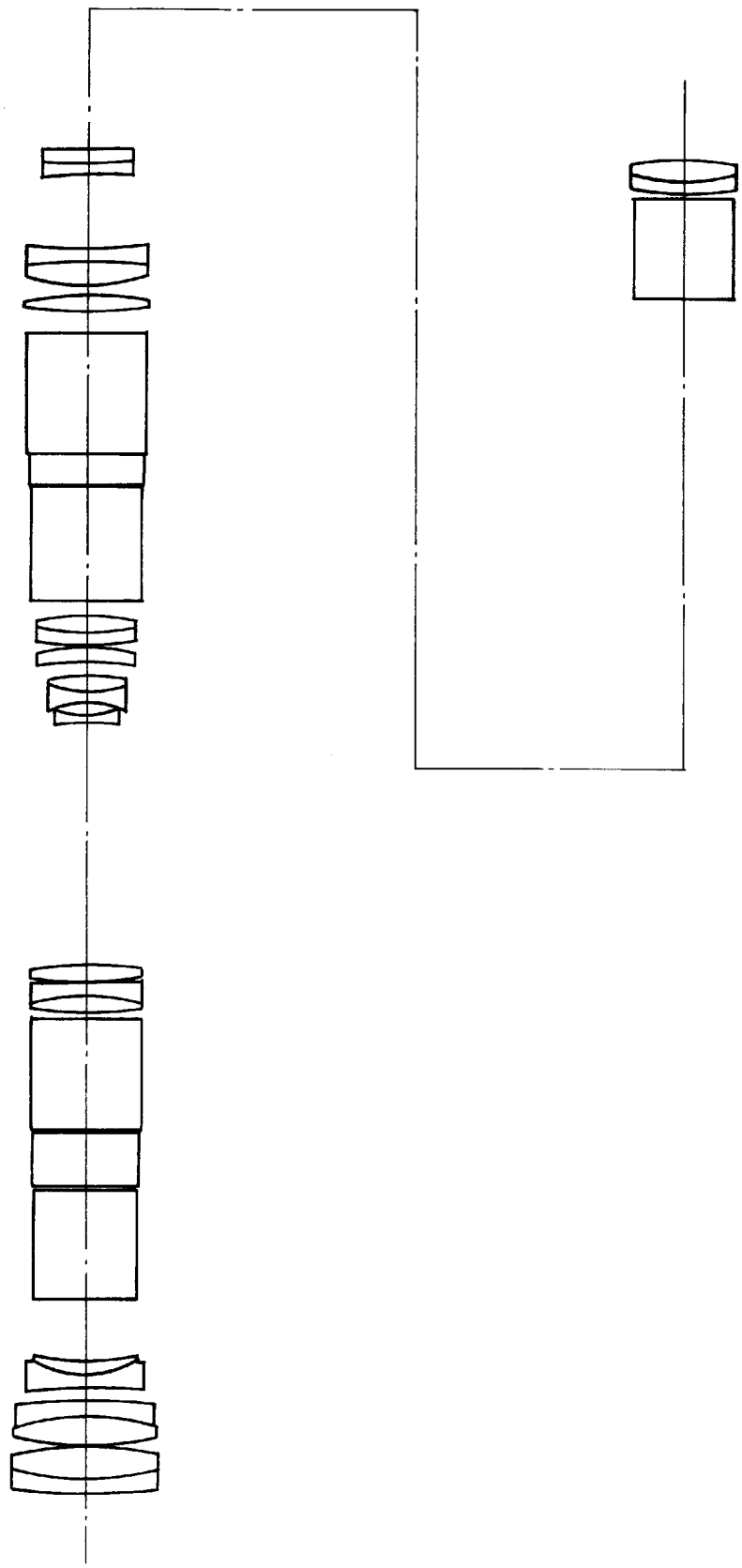
FIG. 13 shows a sectional view illustrating the second embodiment of the stereoscopic microscope according to the present invention when it is set at a magnification of 0.9×.
Figure 14:
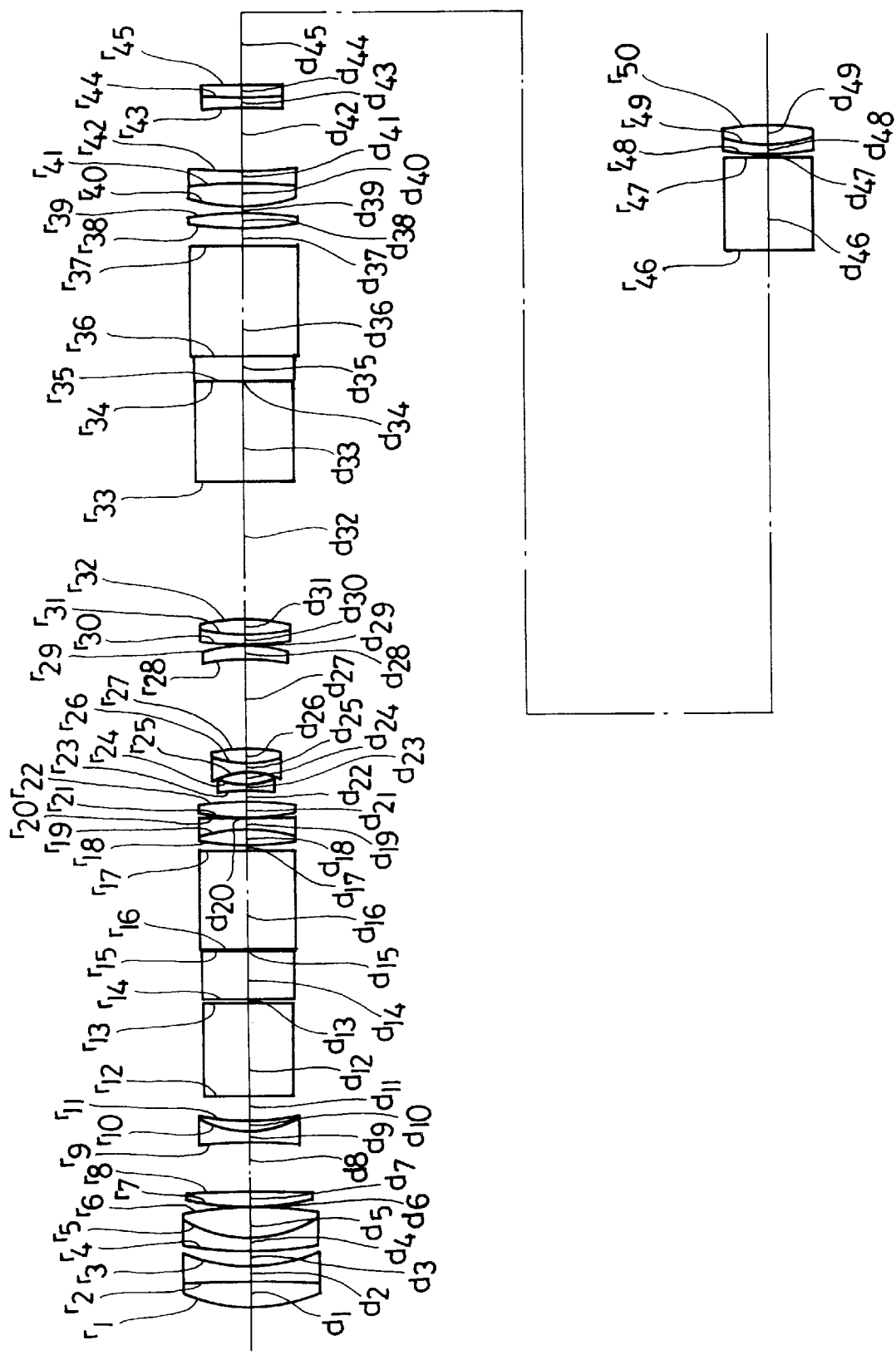
FIG. 14 shows a sectional view illustrating a third embodiment of the stereoscopic microscope according to the present invention when it is set at a magnification of 0.36.
Figure 15:
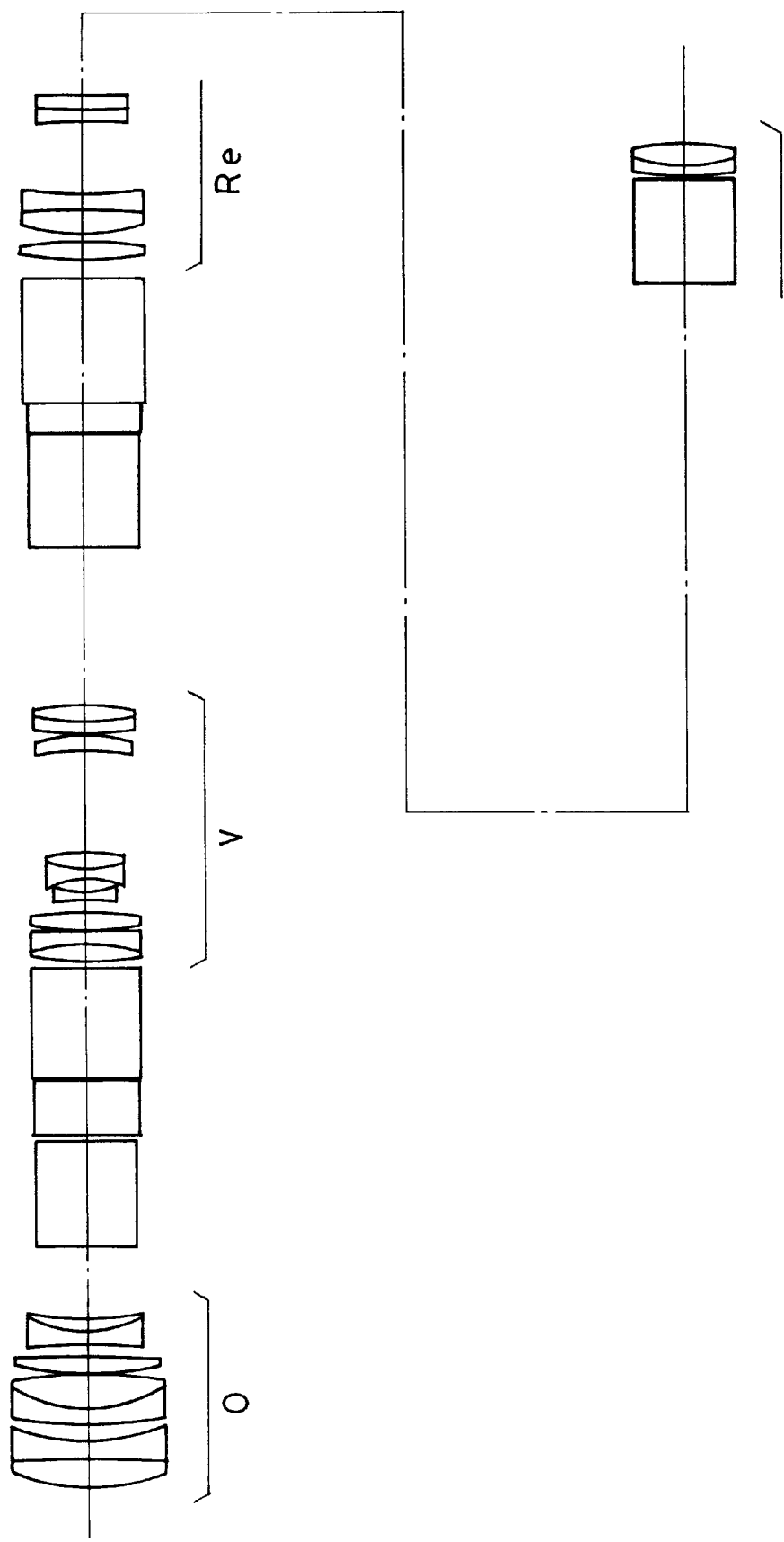
FIG. 15 shows a sectional view illustrating the third embodiment of the stereoscopic microscope according to the present invention when it is set at a magnification of 0.23×.
Figure 16:
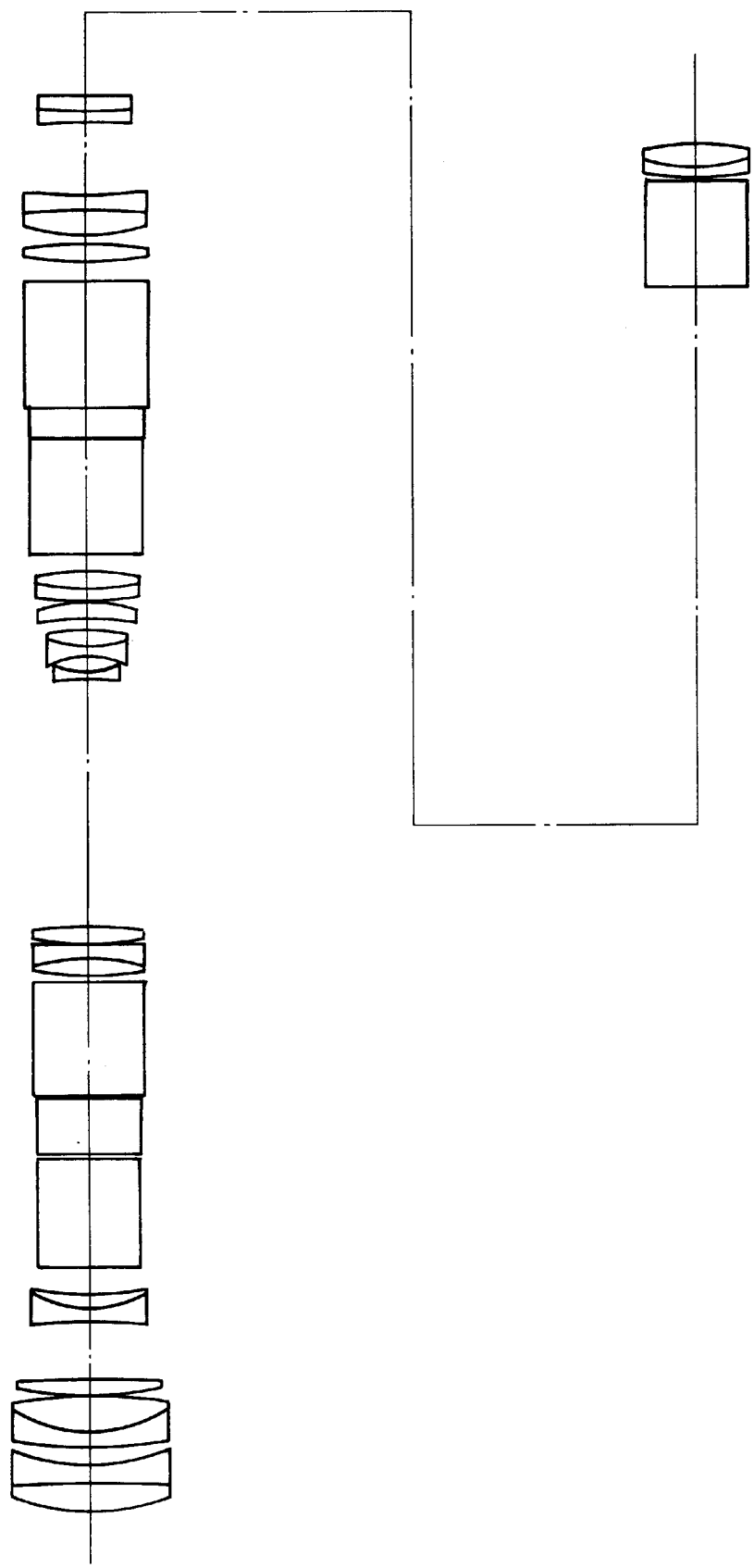
FIG. 16 shows a sectional view illustrating the third embodiment of the stereoscopic microscope according to the present invention when it is set at a magnification of 1.4×.
Figure 17:
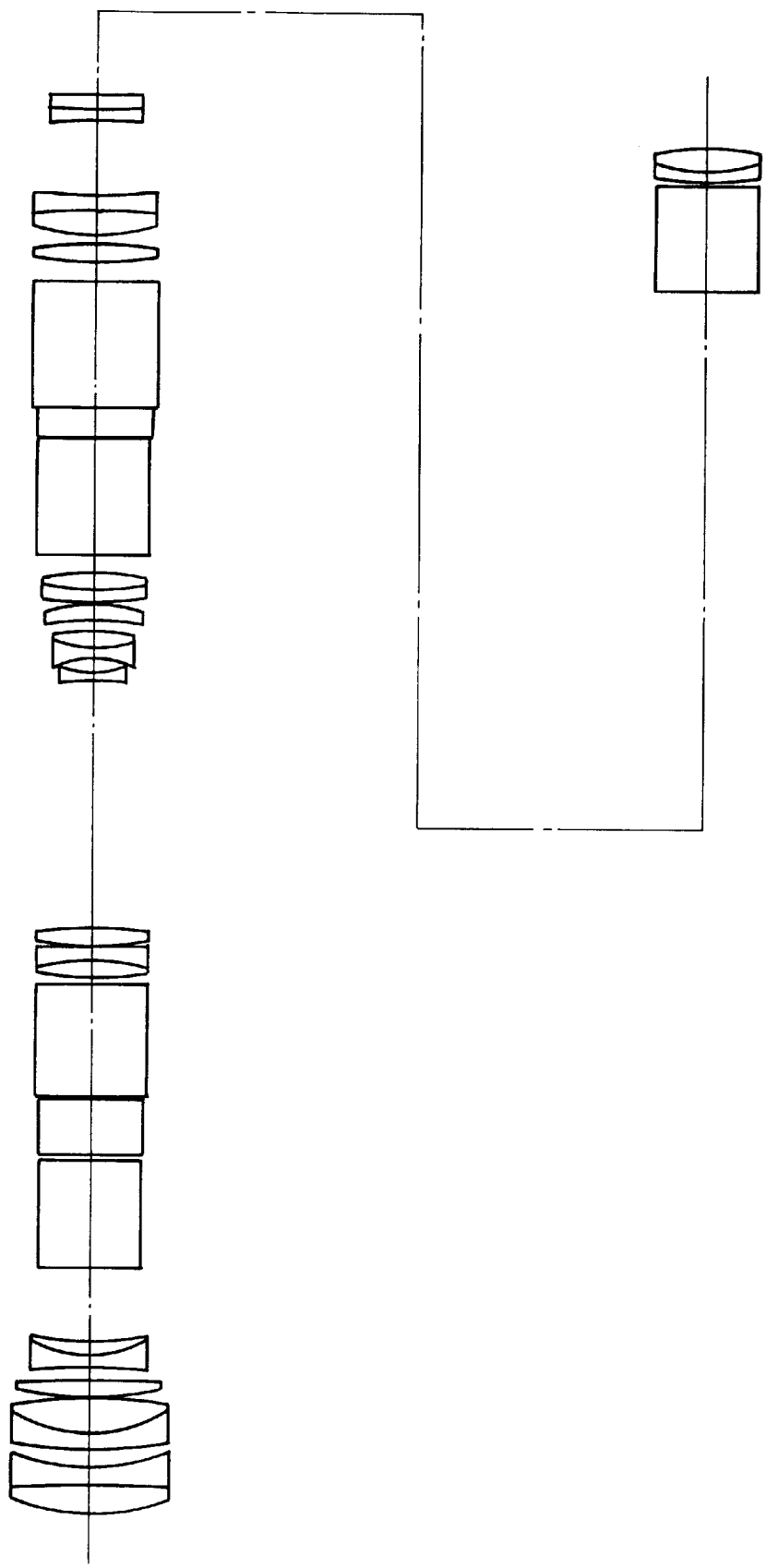
FIG. 17 shows a sectional view illustrating the third embodiment of the stereoscopic microscope according to the present invention when it is set at a magnification of 0.9×.

The second embodiment of the stereoscopic microscope is illustrated in FIGS. 10 through 13. Out of these drawings, FIG. 10 shows a condition of a magnification of 0.36×., FIG. 11 shows a condition of a magnification of 0.23× and FIG. 12 shows a condition of a magnification of 1.4× and FIG. 13 shows a condition of a magnification of 0.9×. The second embodiment is an example wherein an objective lens system which has a variable working distance is used.

In the second embodiment, an objective lens system is configured as a retrofocus type lens system consisting of a first lens unit which comprises a positive lens component consisting of a negative meniscus lens element and a biconvex lens element, and a positive lens component consisting of a biconvex lens element and a negative meniscus lens element, and has a positive refractive power, and a second lens unit which comprises a negative lens component consisting of a biconcave lens element and a positive meniscus lens element, and has a negative refractive power. Further, a vari-focal optical system consists of a first positive lens unit, a second negative lens unit and a third positive lens unit: the first lens unit consisting of a positive lens component which comprises a positive lens element and a biconcave lens element, and a positive lens component which comprises a single biconvex lens element, the second lens unit consisting of a negative lens component which comprises a single biconcave lens element, and a meniscus lens component which comprises a biconcave lens element and a biconvex lens element, and the third lens unit consisting of a positive lens component which comprises a single positive meniscus lens element, and a positive lens component which comprises a negative meniscus lens element and a biconvex lens element. Further, the imaging relay optical system of one cycle consists of: a section on the object side of an imaging point which consists of a positive lens component which comprises a single biconvex lens element, a positive meniscus lens component which comprises a biconvex lens element and a biconcave lens element, and a lens component which comprises a biconcave lens element and a plano-convex lens elements and another section on the image side of the imaging point which consists of a positive lens component comprising a negative meniscus lens element and a biconvex lens element.

Differently from the first embodiment, the second embodiment uses the objective lens system which has a variable working distance. In the second embodiment, an extraordinarily dispersive glass material is used for the first convex lens unit of the objective lens system, the first lens unit and the third lens unit of the vari-focal optical system, and the convex lens elements disposed before and after the imaging point in the imaging relay optical system of one cycle. Specifically, the biconvex lens element ($r_2$ to $r_3$) of the positive lens component disposed on the object side in the objective lens system, the biconvex lens element ($r_{16}$ to $r_{17}$) of the positive lens component disposed in the first lens unit of the vari-focal optical system, the biconvex lens element ($r_{29}$ to $r_{30}$) of the positive lens component disposed in the third lens unit of the vari-focal optical system and the two biconvex lens elements ($r_{38}$ to $r_{39}$ and $r_{47}$ to $r_{48}$) of the positive lens components disposed before and after the imaging point in the imaging relay optical system one cycle are made of the extraordinary dispersive glass material.

Though the second embodiment uses the uniaxial optical system which is configured as an eccentric optical system and has a variable working distance, it favorably corrects aberrations, the secondary spectra in particular.

The third embodiment of the stereoscopic microscope is set at magnifications of 0.36×, 0.23×, 1.4× and 0.9× as illustrated in FIGS. 14, 15, 16 and 17, respectively. The third embodiment uses an extraordinarily dispersive optical glass material for a convex lens element ($r_5$ to $r_6$) of a positive lens component disposed in an objective lens system, convex lens elements ($r_{18}$ to $r_{19}$) and $r_{31}$ to $r_{32}$) disposed in a first lens unit of a vari-focal optical system, and convex lens elements ($r_{40}$ to $r_{41}$ and $r_{49}$ to $r_{50}$) disposed before and after an imaging point in an imaging relay optical system of one cycle.

The third embodiment is an optical system which corrects astigmatism and lateral chromatic aberration with an additional meniscus lens component which is disposed on the object side in an objective lens system.

Figure 18:
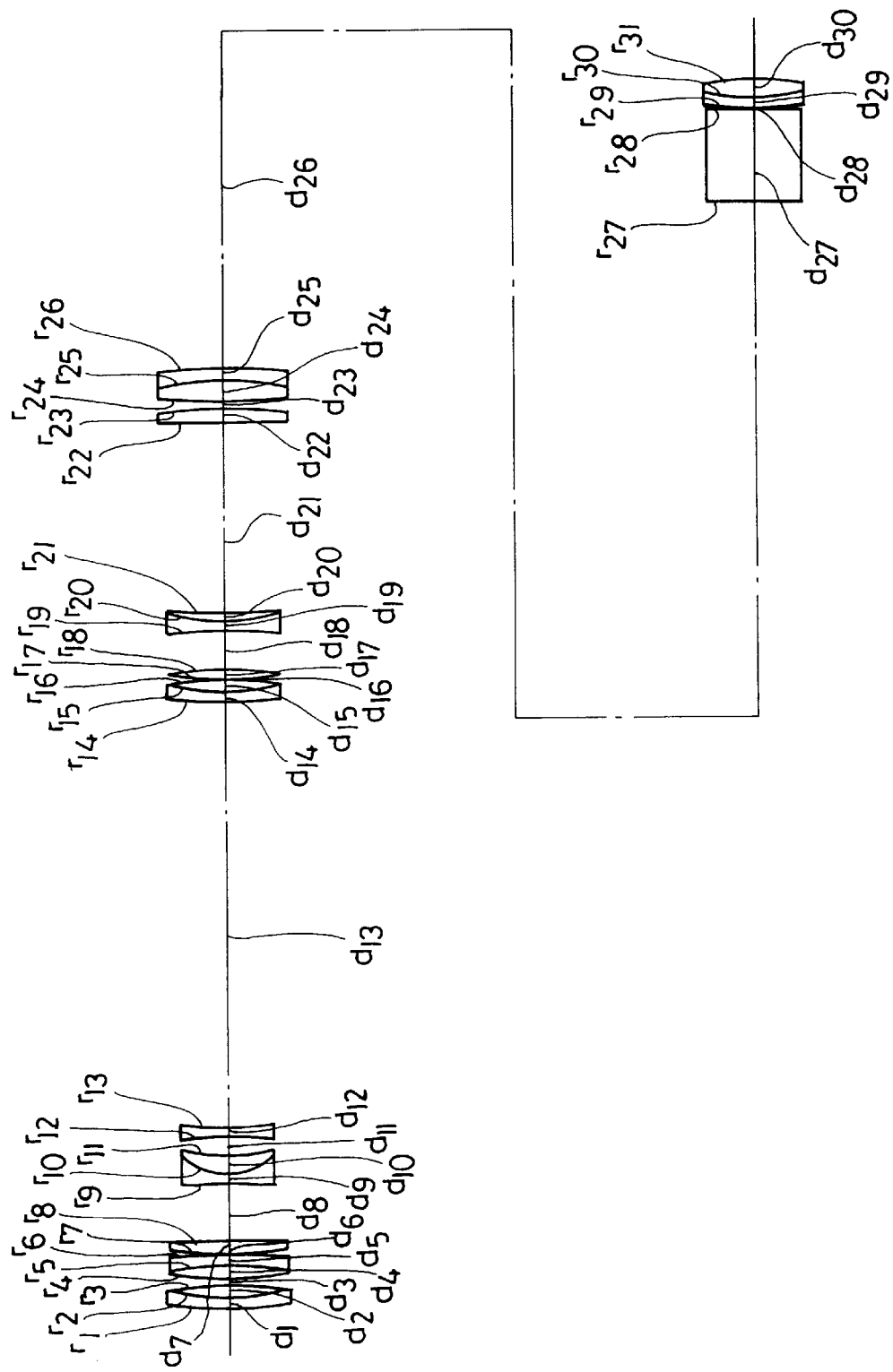
FIG. 18 shows a sectional view illustrating a fourth embodiment of the stereoscopic microscope according to the present invention when it is set at a magnification of 0.3×.
Figure 19:
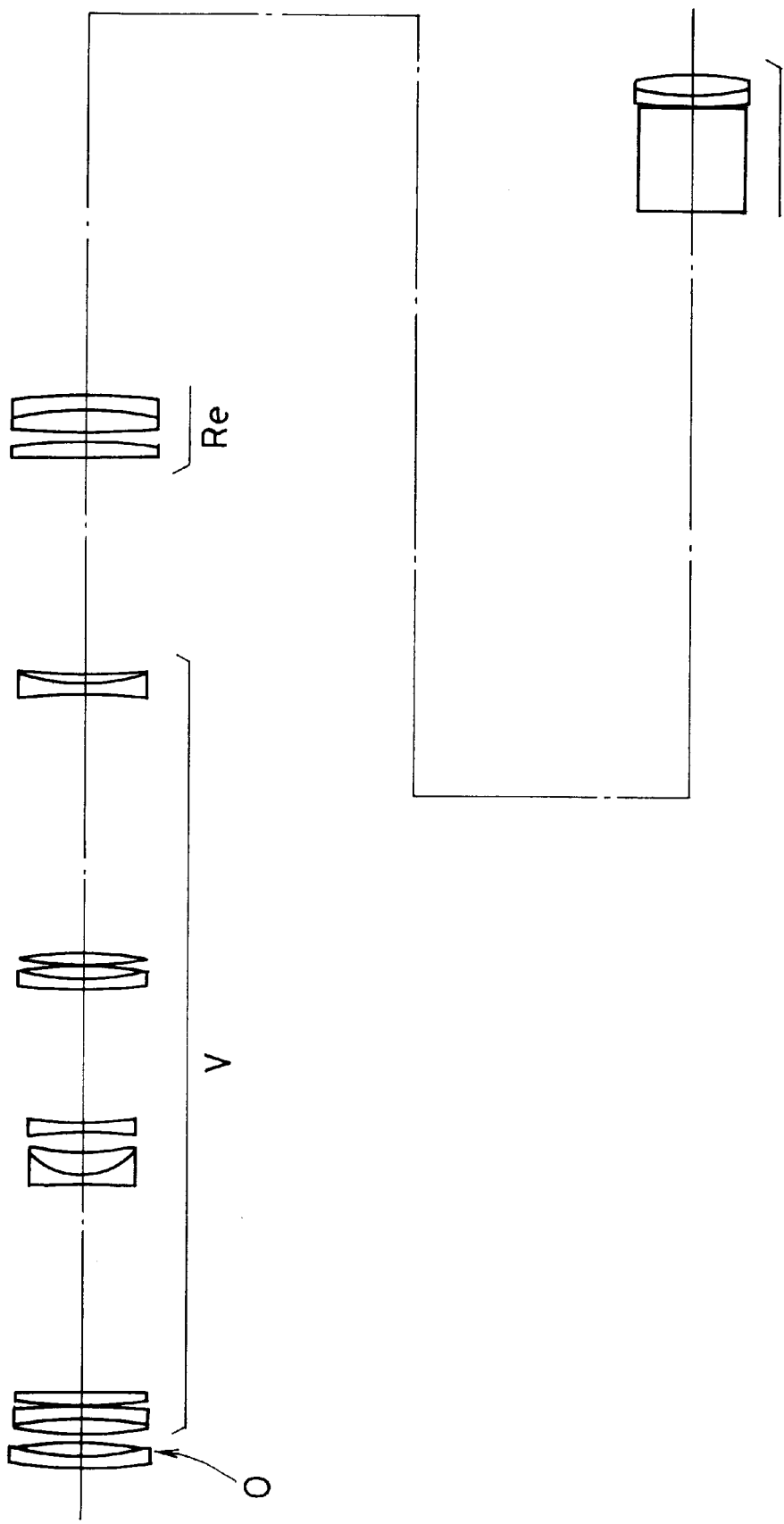
FIG. 19 shows a sectional view illustrating the fourth embodiment of the stereoscopic microscope according to the present invention when it is set at a magnification of 1.7×.

The fourth embodiment of the stereoscopic microscope is illustrated in FIGS. 18 and 19 which show conditions where it is set at magnifications of 0.3× and 1.7× respectively. This embodiment is characterized in that a vari-focal optical system comprises four lens units so as to have an enhanced vari-focal ratio. Specifically, the fourth embodiment consists of: an objective lens system which comprises a positive lens component consisting of a positive lens element and a negative lens element; a vari-focal optical system comprising a first positive lens unit consisting of a positive lens component which comprises a positive lens element and a negative lens element and a single positive lens component, a second negative lens unit consisting of a negative lens component which comprises a negative lens element and a positive lens element and a single negative lens component, a third positive lens unit consisting of a positive lens component which comprises a negative meniscus lens element and a positive lens element and a single positive lens component, and a fourth negative lens unit consisting of a negative lens component which comprises a negative lens element and a positive meniscus lens element; and a relay optical system consisting of a single positive lens component, and a positive lens component which comprises a positive lens element and a negative meniscus lens element disposed before an imaging point, and a positive lens component which comprises a negative meniscus lens element and a positive lens element disposed after the imaging point.

The fourth embodiment uses an extraordinarily dispersive optical glass material for the convex lens elements ($r_4$ to $r_5$ and $r_{15}$ to $r_{16}$) disposed in the first lens unit and the third lens unit of the vari-focal optical system, and the convex lens elements ($r_{24}$ to $r_{25}$ and $r_{30}$ to $r_{31}$) disposed before and after the imaging point in an imaging relay optical system of one cycle.

The fourth embodiment enhances a vari-focal ratio by composing the vari-focal optical system of the four lens units and corrects the secondary spectra by using the extraordinarily dispersive optical glass material as described above.

Figure 20:
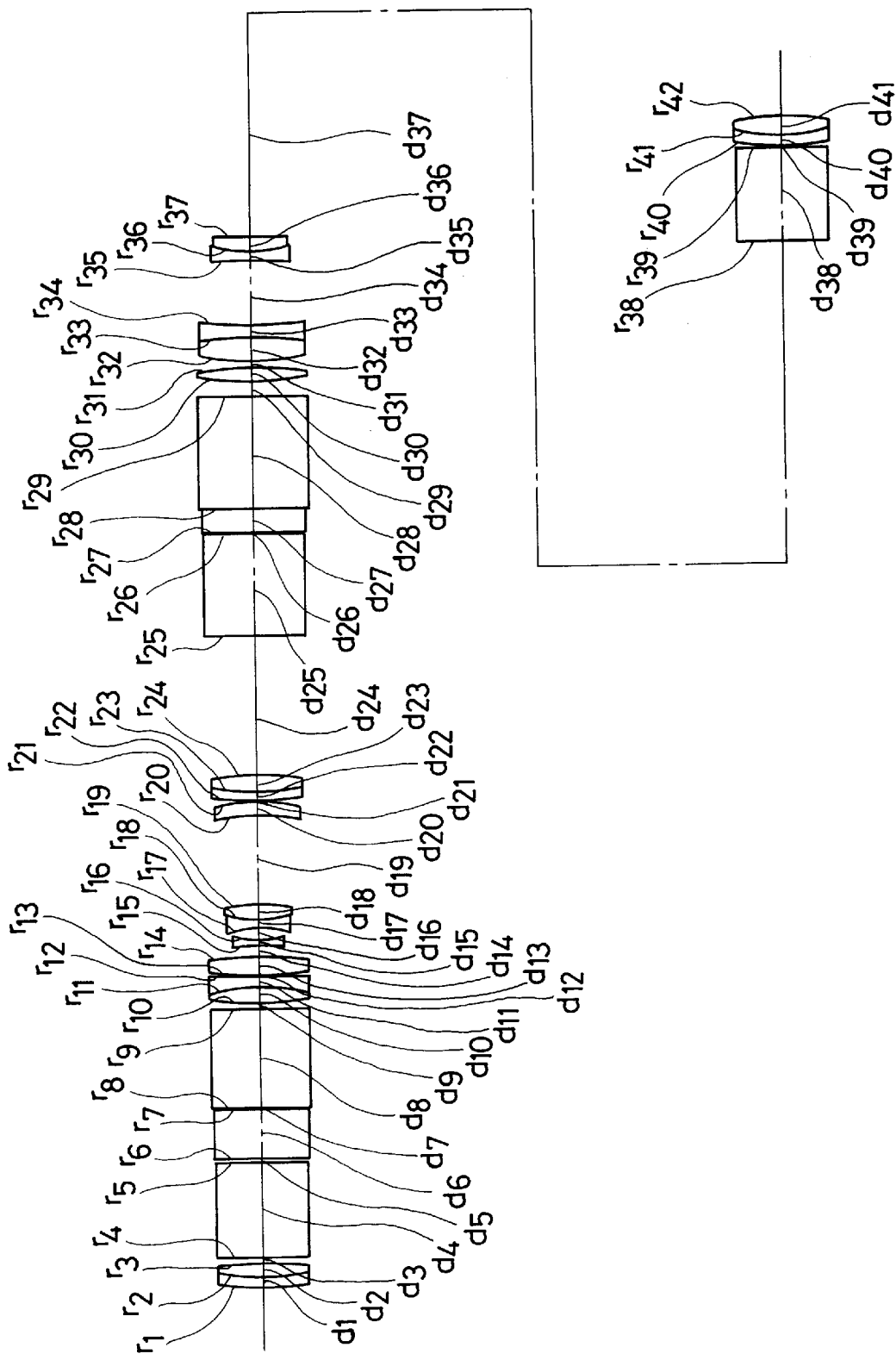
FIG. 20 shows a sectional view illustrating a fifth embodiment of the stereoscopic microscope according to the present invention when it is set at a magnification of 0.3×.
Figure 21:
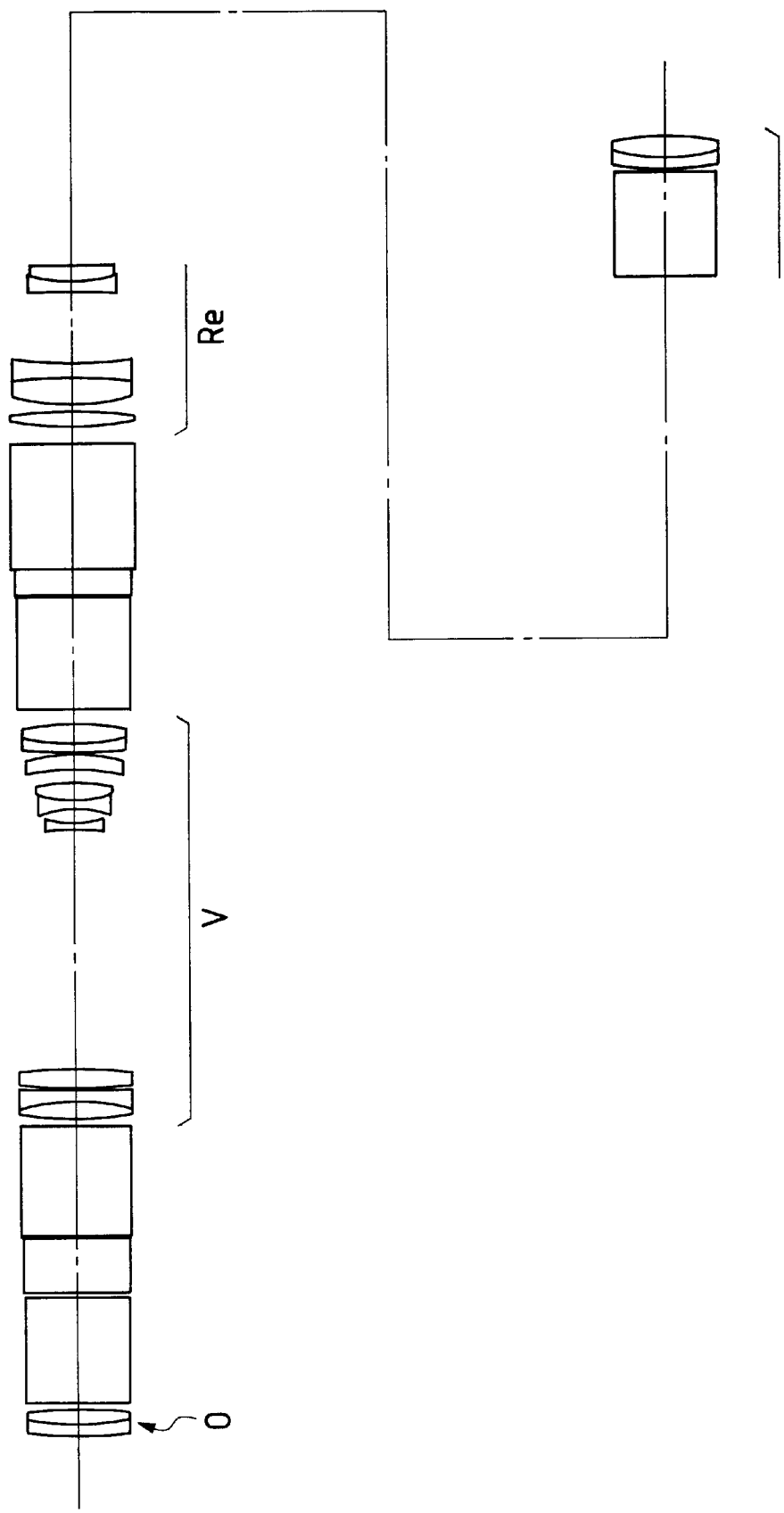
FIG. 21 shows a sectional view illustrating the fifth embodiment of the stereoscopic microscope according to the present invention when it is set at a magnification of 1.25×.

The fifth embodiment of the stereoscopic microscope is illustrated in FIGS. 20 and 21: a condition of a magnification of 0.3 1× and a condition of a magnification of 1.25× being shown in FIG. 20 and FIG. 21, respectively.

In the fifth embodiment, an objective lens system consists of a positive lens component which comprises a negative lens element and a positive lens element, and a vari-focal optical system consists of three lens units, i.e., a first positive lens unit, a second negative lens unit and a third positive lens unit. The first lens unit consists of a meniscus lens component and a positive lens component, the second lens unit consists of a negative lens component and a meniscus lens component, and the third lens unit consists of a meniscus lens component and a positive lens component. An imaging relay optical system of one cycle consists of a positive lens component, a meniscus lens component, a negative lens component and a positive lens component which is disposed after an imaging point.

The fifth embodiment uses an extraordinarily dispersive optical glass material for the positive lens component which is disposed on the image side in the imaging relay optical system of one cycle.

Figure 22:
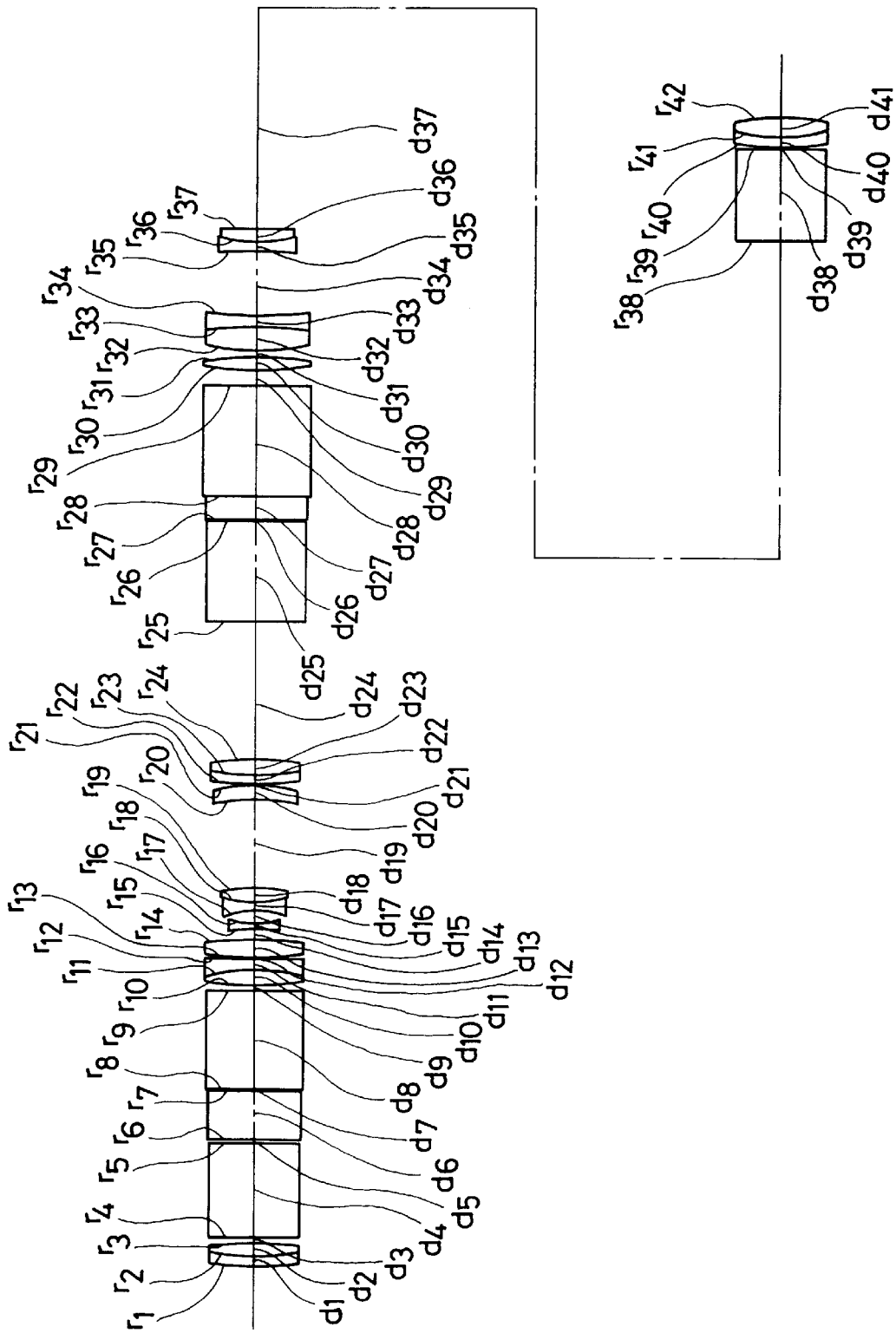
FIG. 22 shows a sectional view illustrating the fifth embodiment of the stereoscopic microscope according to the present invention when it is set at a magnification of 0.31×.
Figure 23:
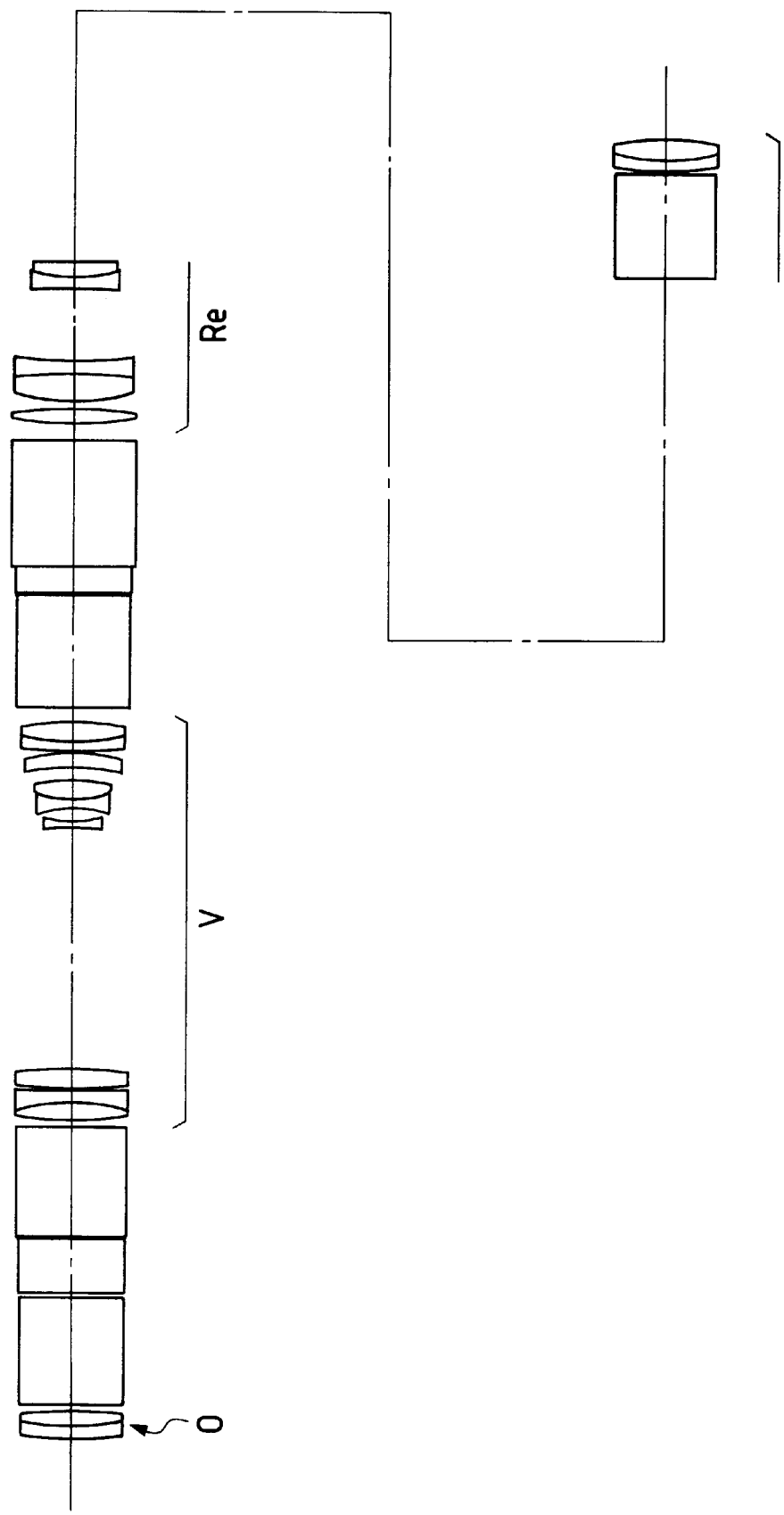
FIG. 23 shows a sectional view illustrating a sixth embodiment of the stereoscopic microscope according to the present invention when it is set at a magnification of 1.25×.

The sixth embodiment of the stereoscopic microscope is illustrated in FIGS. 22 and 23: FIG. 22 showing a condition of a magnification of 0.31× and FIG. 23 showing a condition of a magnification of 1.25×.

In the sixth embodiment, an objective lens system consists of a positive lens component which comprises a negative lens element and a positive lens element, and a vari-focal optical system consists of three lens units, i.e., a first positive lens unit, a second negative lens unit and a third positive lens unit: the first lens unit consisting of a meniscus lens component and a positive lens component, the second lens unit consisting of a negative lens component and a meniscus lens component, and the third lens unit consisting of a meniscus lens component and a positive lens component. Further, an imaging relay optical system of one cycle consists of a positive lens component, a meniscus lens component, a negative lens component and a positive lens component which is disposed after an imaging point.

The sixth embodiment uses an extraordinarily dispersive optical glass material in the first lens unit of the vari-focal optical system, thereby making variations of chromatic aberration caused due to magnification changes smaller than those in the fifth embodiment.

Chromatic aberration coefficients PLC and SLC for the embodiments described above are as listed below:

| Embodiment 1 | | | |
|---|---|---|---|
| WD | Magnification | PLC | SLC |
| 300 | 0.31 | −0.027 | −0.016 |
| 300 | 0.63 | 0.002 | 0.001 |
| 300 | 1.25 | 0.034 | 0.025 |

| Embodiment 2 | | | |
|---|---|---|---|
| WD | Magnification | PLC | SLC |
| 250 | 0.36 | −0.006 | −0.001 |
| 300 | 0.3 | −0.016 | −0.007 |
| 380 | 0.23 | −0.027 | −0.013 |
| 250 | 0.72 | 0.025 | 0.019 |
| 300 | 0.6 | 0.012 | 0.011 |
| 380 | 0.47 | −0.002 | 0.002 |
| 250 | 1.44 | 0.049 | 0.035 |
| 300 | 1.19 | 0.046 | 0.033 |
| 380 | 0.93 | 0.042 | 0.031 |

Embodiment 3

| WD | Magnification | PLC | SLC |
| --- | --- | --- | --- |
| 250 | 0.36 | −0.016 | −0.009 |
| 300 | 0.3 | −0.025 | −0.014 |
| 380 | 0.23 | −0.035 | −0.020 |
| 250 | 0.71 | 0.011 | 0.008 |
| 300 | 0.6 | 0.001 | 0.000 |
| 380 | 0.47 | −0.014 | −0.007 |
| 250 | 1.43 | 0.049 | 0.035 |
| 300 | 1.19 | 0.047 | 0.034 |
| 380 | 0.94 | 0.044 | 0.032 |

Embodiment 4

| WD | Magnification | PLC | SLC |
| --- | --- | --- | --- |
| 300 | 0.3 | −0.024 | −0.015 |
| 300 | 0.89 | −0.005 | −0.006 |
| 300 | 1.68 | −0.007 | −0.006 |

Embodiment 5

| WD | Magnification | PLC | SLC |
| --- | --- | --- | --- |
| 300 | 0.31 | −0.06 | −0.035 |
| 300 | 0.63 | −0.035 | −0.021 |
| 300 | 1.25 | −0.003 | 0.006 |

Embodiment 6

| WD | Magnification | PLC | SLC |
| --- | --- | --- | --- |
| 300 | 0.31 | −0.039 | −0.021 |
| 300 | 0.63 | −0.012 | −0.005 |
| 300 | 1.25 | 0.021 | 0.020 |

Out of these embodiments, the second, third, fourth, fifth and sixth embodiments also dispose imaging lens components after the imaging relay optical systems, for example, as shown in FIG. 24. In the numerical data, the reference symbol $d_{48}$ in the second embodiment, the reference symbol $d_{50}$ in the third embodiment and the reference symbol $d_{31}$ in the fourth embodiment represent distances as measured from final surfaces of the imaging relay optical systems to front surfaces of the imaging lens components.

What is claimed is:

1. A stereoscopic microscope, comprising:
   a uniaxial optical system consisting of
      an objective optical system,
      a vari-focal optical system disposed coaxially with said objective optical system, and
      an imaging relay optical system of one cycle; and
   at least a pair of observation optical systems comprising a pair, right and left, of aperture stops disposed after said imaging relay optical system of one cycle, a plurality of imaging lens components and a plurality of eyepieces,
   wherein observation optical axes pass through locations different from that of an optical axis of said uniaxial optical system, said observation optical axes being determined by said pair of aperture stops,
   wherein at least an image rotator is disposed after said imaging relay optical system of one cycle and before said observation optical systems,
   wherein said image rotator has a rotating axis and said observation optical systems have a rotating axis,
   wherein said rotating axis of said observation optical systems and said rotating axis of said image rotator are arranged to be parallel to each other, and
   wherein said image rotator and said observation optical systems are rotated with a ratio of their rotating angles of 1:2.

2. A stereoscopic microscope according to claim 1, wherein said rotating axis of said image rotator and said rotating axis of said observation optical system are arranged to be coaxial.

3. A stereoscopic microscope according to claim 2, wherein said objective optical system comprises a plurality of lens units, and wherein a working distance is varied by changing an airspace between said plurality of lens units.

4. A stereoscopic microscope according to claim 3, wherein said objective lens system comprises, in order from the object side, a first positive lens unit and a second negative lens unit, and a working distance is changed by varying an airspace reserved between said first lens unit and said second lens unit.

5. A stereoscopic microscope according to claim 4, wherein the first lens unit of said objective lens system comprises a positive lens component which consists of a negative lens element and a positive lens element, and a positive lens component which consists of a positive lens element and a negative lens element.

6. A stereoscopic microscope according to claim 4, wherein the first positive lens unit of said objective lens system comprises a meniscus lens component which has a convex surface on the object side, a positive lens component which consists of a positive lens element and a negative lens element, and a positive lens component.

7. A stereoscopic microscope according to claim 2, wherein said vari-focal optical system comprises a plurality of positive lens units, and wherein at least one of the positive lens units which are disposed on the object side and the image side out of said positive lens units comprises a positive lens component made of an extraordinarily dispersive optical material satisfying the following condition (1):

$$\Delta\theta_{gF} > 0.01, v_d > 50 \tag{1}$$

wherein the reference symbol $\Delta\theta_{gF}$ represents a value which is given by the following formula:

$$\Delta\theta_{gF} = \theta_{gF} - \theta$$

wherein $\theta_{gF}$ and $\theta$ are given by the following formulae (B) and (C) respectively when refractive indices for the F-line, C-line and g-line are represented by $n_F$, $n_C$ and $n_g$ and an Abbe's number is designated by $v$ $$\theta_{gF} = (n_g - n_F)/(n_F - n_C) \tag{B}$$

$$\theta = -0.00162v + 0.6416 \tag{C}$$

8. A stereoscopic microscope according to claim 7, further satisfying, the following condition (1-1):

$$\Delta\theta_{gF} < 0.025, v_d > 75 \tag{1-1}$$

9. A stereoscopic microscope according to claim 7, wherein said vari-focal optical system comprises, in order from the object side, a first positive lens unit, second negative lens unit and a third positive lens unit, and wherein said fist positive lens unit comprises, in order from the object side, a meniscus lens component having a convex surface on the object side and a positive lens component.

10. A stereoscopic microscope according to claim 9, wherein said second negative lens unit of said vari-focal optical system comprises in order from the object side, a negative lens component and a meniscus lens component, and wherein said third lens unit comprises, in order from the object side, a meniscus lens component and a positive lens component.

11. A stereoscopic microscope according to claim 7, wherein said vari-focal optical system comprises, in order from the object side, a first positive lens unit, a second negative lens unit, a third positive lens unit and a fourth negative lens unit, wherein said first positive lens unit comprises, in order from the object side, a positive lens component and a positive lens component, wherein said second negative lens unit comprises, in order from the object side, a negative lens component and a negative lens component, wherein said third positive lens unit comprises, in order from the object side, a positive lens component and a positive lens component, and wherein said fourth negative lens unit comprises of a negative lens component.

12. A stereoscopic microscope according to claim 2, wherein said microscope comprises an optical path splitting optical system which splits a light bundle form said objective lens system into light bundles to a main observation side and at least one subsidiary observation side, and wherein an image rotator is disposed in an optical path on said subsidiary observation side.

13. A stereoscopic microscope, comprising:
- a uniaxial optical system consisting of
  - an objective optical system,
  - a vari-focal optical system disposed coaxially with said objective optical system, and
  - an imaging relay optical system of one cycle; and
- at least a pair of observation optical systems comprising:
  - a pair, right and left, of aperture stops which are disposed after said imaging relay optical system of one cycle,
  - a plurality of imaging lens components, and
  - a plurality of eyepieces,
- wherein observation optical axes pass through locations that are different from that of an optical axis of said uniaxial optical system, said observation optical axes being a pair of axes of the observation optical systems determined by said pair of aperture stops, and
- wherein at least one of said vari-focal optical system and said imaging relay optical system of one cycle comprises a positive lens component made of an extraordinary dispersive optical material satisfying the following condition (1);

$$\Delta\theta_{gF} > 0.01, \nu_d > 50 \qquad (1)$$

wherein the reference symbol $\Delta\theta_{gF}$ represents a value which is given by the following formula:

$$\Delta\theta_{gF} = \theta_{gF} - \theta$$

wherein $\theta_{gF}$ and $\theta$ are given by the following formulae (B) and (C) respectively when refractive indices for the F-line, C-line and g-line are represented by $n_F$, $n_C$ and $n_g$ and an Abbe's number is designated by $\nu$ $$\theta_{gF} = (n_g - n_F)/(n_F - n_C) \qquad (B)$$

$$\theta = -0.00162\nu + 0.6416 \qquad (C),$$

and wherein chromatic aberration coefficients of an imaging lens component of said plurality of imaging lens components on an image surface satisfy the following conditions (8) and (9):

| (8) | −0.05 | <PLC | <0.05 |
|---|---|---|---|
| (9) | −0.05 | <SLC | <0.05 | wherein the reference symbols PLC and SLC represent values which are given by the following formulae when said imaging lens component has a focal length of 210 mm and a field number of 21, and the aperture stop has a diameter of 10 mm:

| PLC = | $2\mu h_{M1} \{(n_{F1} - n_{C1}) - n_{R1}/n_{R2}(n_{F2} - n_{C2})\}$ |
|---|---|
| SLC = | $2\mu h_{M1} \{(n_{F1} - n_{d1}) - n_{R1}/n_{R2}(n_{F2} - n_{d2})\}$ |
| $\mu =$ | $-1/(2n_{R2}U_2)$ | in an afocal condition, a value of $\mu$ is given by the following formula:

$$\mu = -1/(2n_{R2}h_{M2})$$

wherein the reference symbols $n_{R1}$ and $n_{R2}$ represent refractive indices of media on the sides of incidence and emergence respectively at a corresponding standard wavelength, the reference symbols $n_{F1}$ and $n_{F2}$ designate refractive indices of the media on the sides of incidence and emergence respectively for the F-line, the reference symbols $n_{C1}$ and $n_{C2}$ denote refractive indices of the media on the sides of incidence and emergence respectively for the C-line, the reference symbols $n_{d1}$ and $n_{d2}$ denote refractive indices of the media on the sides of incidence and emergence respectively for the d-line, the reference symbols $h_{M1}$ and $h_{M2}$ represent heights of a marginal ray on the sides of incidence and emergence respectively, and the reference symbol $U_2$ designates an angle of emergence of the marginal ray.

14. A stereoscopic microscope, comprising:
- a uniaxial optical system consisting of
  - an objective optical system,
  - a vari-focal optical system disposed coaxially with said objective optical system, and
  - an imaging relay optical system of one cycle; and
- at least a pair of observation optical systems comprising:
  - a pair, right and left, of aperture stops which are disposed after said imaging relay optical system of one cycle,
  - a plurality of imaging lens components, and
  - a plurality of eyepieces,
- wherein observation optical axes pass through locations that are different from that of an optical axis of said uniaxial optical system, said observation optical axes being a pair of axes of the observation optical systems determined by said pair of aperture stops, and
- wherein at least one of said vari-focal optical system and said imaging relay optical system of one cycle comprises a positive lens component made of an extraordinary dispersive optical material satisfying the following condition (1):

$$\Delta\theta_{gF} > 0.01, v_d > 50 \tag{1}$$

wherein the reference symbol $\Delta\theta_{gF}$ represents a value which is given by the following formula:

$$\Delta\theta_{gF} = \theta_{gF} - \theta$$

wherein $\theta_{gF}$ and $\theta$ are given by the following formulae (B) and (C) respectively when refractive indices for the F-line, C-line and g-line are represented by $n_F$, $n_C$ and an Abbe's number is designated by $v$ $$\theta_{gF} = (n_g - n_F)/(n_F - n_C) \tag{B}$$

$$\theta = -0.00162v + 0.6416 \tag{C}$$

and wherein said objective lens system consists of a first lens unit which has a positive focal length and a second lens unit which has a negative focal length, wherein a working distance is changed by varying an airspace reserved between said first lens unit and said second lens unit, and wherein said objective lens system satisfies the following conditions (5) and (6):

$$0.17 < -f_{02}/f_0 < 0.64 \tag{5}$$

$$f_p/f_{01} < 2.3 \tag{6}$$

wherein the reference symbol $f_0$ represents a focal length of the objective lens system, the reference symbols $f_{01}$ and $f_{02}$ designate focal lengths of the first lens unit and the second lens unit respectively of the objective lens system, and the reference symbol $f_p$ denotes a focal length of the positive lens component made of the extraordinarily dispersive optical material.

15. A stereoscopic microscope according to claim 14, wherein said first lens unit of said objective lens system comprises two cemented lens components each of which consists of a positive lens element and a negative lens element, and wherein cemented surfaces of said two cemented lens components are disposed in directions reverse to each other.

16. A stereoscopic microscope according to claim 15, wherein a lens unit disposed on the object side in said objective lens system comprises, in order from the object side, a meniscus lens component having a convex surface on the object side, two biconvex lens components and a biconcave lens component.

17. A stereoscopic microscope, comprising:
a uniaxial optical system consisting of
an objective optical system, and
a vari-focal optical system which is disposed coaxially with said objective optical system and an imaging relay optical system of one cycle; and
at least a pair of observation optical systems comprising:
a pair, right and left, of aperture stops which are disposed after said imaging relay optical system of one cycle,
a plurality of imaging lens components, and
a plurality of eyepieces,
wherein observation optical axes pass through locations that are different from that of an optical axis of said uniaxial optical system, said observation optical axes being a pair of axes of the observation optical systems determined by said pair of aperture stops, and
wherein at least one of said vari-focal optical system and said imaging relay optical system of one cycle comprises a positive lens component made of an extraordinary dispersive optical material satisfying the following condition (1):

$$\Delta\theta_{gF} > 0.01, v_d > 50 \tag{1}$$

wherein the reference symbol $\Delta\theta_{gF}$ represents a value which is given by the following formula:

$$\Delta\theta_{gF} = \theta_{gF} - \theta$$

wherein $\theta_{gF}$ and $\theta$ are given by the following formulae (B) and (C) respectively when refractive indices for the F-line, C-line and g-line are represented by $n_F$, $n_C$ and $n_g$ and an Abbe's number is designated by $v$ $$\theta_{gF} = (n_g - n_F)/(n_g - n_C) \tag{B}$$

$$\theta = -0.00162v + 0.6416 \tag{C},$$

and wherein said vari-focal optical system comprises a plurality of positive lens units, wherein at least one of positive lens units which are disposed on the object side and image side of said plurality of positive lens units comprises a positive lens component made of said extraordinary dispersive optical material, and wherein said vari-focal optical system is composed, in order from the object side, of a first positive lens unit, a second negative lens unit and a third positive lens unit, and wherein said first positive lens unit is composed, in order from the object side, of a meniscus lens component having a convex surface on the object side and a positive lens component.

18. A stereoscopic microscope according to claim 17, wherein said second negative lens unit of said vari-focal optical system comprises, in order from the object side, a negative lens component and a meniscus lens component, and
wherein said third lens unit comprises, in order from the object side, a meniscus lens component and a positive lens component.

19. A stereoscopic microscope, comprising:
a uniaxial optical system consisting of
an objective optical system, and
a vari-focal optical system which is disposed coaxially with said objective optical system and an imaging relay optical system of one cycle; and
at least a pair of observation optical systems comprising:
a pair, right and left, of aperture stops which are disposed after said imaging relay optical system of one cycle,
a plurality of imaging lens components, and
a plurality of eyepieces,
wherein observation optical axes pass through locations that are different from that of an optical axis of said uniaxial optical system, said observation optical axes being a pair of axes of the observation optical systems determined by said pair of aperture stops,
wherein at least one of said vari-focal optical system and said imaging relay optical system of one cycle comprises a positive lens component made of an extraordinary dispersive optical material satisfying the following condition (1):

$$\Delta\theta_{gF} > 0.01, \nu_d > 50 \tag{1}$$

wherein the reference symbol $\Delta\theta_{gF}$ represents a value which is given by the following formula:

$$\Delta\theta_{gF} = \theta_{gF} - \theta$$

wherein $\theta_{gF}$ and $\theta$ are given by the following formulae (B) and (C) respectively when refractive indices for the F-line, C-line and g-line are represented by $n_F$, $n_C$ and $n_g$ and an Abbe's number is designated by $\nu$ $$\theta_{gF} = (n_g - n_F)/(n_F - N_C) \tag{B}$$

$$\theta = -0.00162\nu + 0.6416 \tag{C},$$

wherein said vari-focal optical system comprises a plurality of positive lens units, wherein at least one of positive lens units which are disposed on the object side and image side out of said plurality of positive lens units comprises a positive lens component made of said extraordinary dispersive optical material, and wherein said vari-focal optical system is composed in order from the object side, of a first positive lens unit, a second negative lens unit, a third positive lens unit and a fourth negative lens unit, wherein said first positive lens unit is composed, in order from the object side, of a positive lens component and a positive lens component, wherein said second negative lens unit is composed, in order from the object side, of a negative lens component and a negative lens component, wherein said third positive lens unit is composed, in order from the object side, of a positive lens component and a positive lens component, and wherein said fourth negative lens unit is composed of a negative lens component.

20. A stereoscopic microscope, comprising:

a uniaxial optical system consisting of
  an objective optical system, and
  a vari-focal optical system which is disposed coaxially with said objective optical system and an imaging relay optical system of one cycle; and
  at least a pair of observation optical systems comprising:
    a pair, right and left, of aperture stops which are disposed after said imaging relay optical system of one cycle,
    a plurality of imaging lens components, and
    a plurality of eyepieces,
  wherein observation optical axes pass through locations that are different from that of an optical axis of said uniaxial optical system, said observation optical axes being a pair of axes of the observation optical systems determined by said pair of aperture stops, and
  wherein at least one of said vari-focal optical system and said imaging relay optical system of one cycle comprises a positive lens component made of an extraordinary dispersive optical material satisfying the following condition (1):

$$\Delta\theta_{gF} > 0.01, \nu_d > 50 \tag{1}$$

wherein the reference symbol $\Delta\theta_{gF}$ represents a value which is given by the following formula:

$$\Delta\theta_{gF} = \theta_{gF} - \theta$$

wherein $\theta_{gF}$ and $\theta$ are given by the following formulae (B) and (C) respectively when refractive indices for the F-line, C-line and g-line are represented by $n_F$, $n_C$ and $n_g$ and an Abbe's number is designated by $\nu$ $$\theta_{gF} = (n_g - n_F)/(n_F - n_C) \tag{B}$$

$$\theta = -0.00162\nu + 0.6416 \tag{C},$$

and wherein said objective optical system comprises a plurality of lens units, and wherein a working distance is varied by changing an airspace or airspaces between said plurality of lens units.

21. A stereoscopic microscope according to claim 20, wherein said objective lens system comprises, in order from the object side, a first positive lens unit and a second negative lens unit, and a working distance is changed by varying an airspace reserved between said first lens unit and said second lens unit.

22. A stereoscopic microscope according to claim 21, wherein the first lens unit of said objective lens system comprises a positive lens component which includes a negative lens element and a positive lens element, and a positive lens component which includes a positive lens element and a negative lens element.

23. A stereoscopic microscope according to claim 21, wherein the first positive lens unit of said objective lens system comprises a meniscus lens component which has a convex surface on the object side, a positive lens component which includes a positive lens element and a negative lens element, and a positive lens component.

* * * * *